United States Patent
Pickart et al.

(10) Patent No.: US 12,327,986 B2
(45) Date of Patent: Jun. 10, 2025

(54) UNITARY FASTENER AND CABLE GUIDANCE DEVICES FOR HELICOPTER BLOCK PULLEYS AND METHODS OF ASSEMBLY AND USE

(71) Applicant: Tallman Equipment Co., INC., Columbus, IN (US)

(72) Inventors: Anthony Pickart, Janesville, WI (US); Edward Youngerman, St. Charles, IL (US); Servando Torres, Addison, IL (US); Andrew Finn, Elmhurst, IL (US)

(73) Assignee: Tallman Equipment Co., INC., Columbus, IN (US)

(*) Notice: Subject to any disclaimer, the term of this patent is extended or adjusted under 35 U.S.C. 154(b) by 1113 days.

(21) Appl. No.: 17/105,444

(22) Filed: Nov. 25, 2020

(65) Prior Publication Data
US 2021/0167585 A1 Jun. 3, 2021

Related U.S. Application Data

(60) Provisional application No. 62/942,175, filed on Dec. 1, 2019.

(51) Int. Cl.
*H02G 1/04* (2006.01)
*B65H 57/14* (2006.01)

(52) U.S. Cl.
CPC .............. *H02G 1/04* (2013.01); *B65H 57/14* (2013.01); *B65H 2701/34* (2013.01); *B65H 2701/36* (2013.01)

(58) Field of Classification Search
CPC ........ H02G 1/02; H02G 1/04; H02G 7/00–05; H02G 7/20; B65H 57/14; B65H 2701/34;
(Continued)

(56) References Cited

U.S. PATENT DOCUMENTS

| 86,139 A | * | 1/1869 | Crowley | .................. B66D 3/04 254/390 |
| 104,597 A | * | 6/1870 | Kalck | ..................... B66D 3/04 254/390 |

(Continued)

FOREIGN PATENT DOCUMENTS

| BR | 202014025097 U2 | * | 7/2016 |
| CN | 105140862 A | * | 12/2015 |

(Continued)

OTHER PUBLICATIONS

Machine translation of BR-202014025097-U2 to Torely et al. (Year: 2016).*

*Primary Examiner* — Joel D Crandall
*Assistant Examiner* — Jonathan R Zaworski
(74) *Attorney, Agent, or Firm* — Brannon Sowers & Cracraft PC

(57) ABSTRACT

A unitary fastener and cable guidance device is operable with a pulley block assembly for stringing cable across towers. The device guides a cable onto a sheave wheel of the assembly, while fastening directly to the assembly through a unitary cantilevered axle. The one-piece design comprises a pair of discs forming an annular depression there between, and a cantilevered axle extending from the outer side of one disc. This unitary configuration reduces the number of fasteners and other components. Since the cantilevered axle is the fastening mechanism, rather than a separate fastener passing through a hole through the center of the device, the minimum outer diameter of the annular depression can be smaller than the outer diameter of the cantilevered axle, allowing the central portion of the device to be smaller and thus its sides to be higher, which helps hold the cable more robustly within the device.

19 Claims, 28 Drawing Sheets

(58) Field of Classification Search
CPC ........ B65H 2701/36; B66D 2700/0191; B66D 2700/026–028
USPC .............. 254/134.3 PA, 134.3 CL, 134.3 R, 254/134.3 FT, 389–417; 242/597, 597.2, 242/597.5, 597.7; 474/165, 198, 199; 384/547, 549, 417–418; 294/132–134
See application file for complete search history.

(56) References Cited

U.S. PATENT DOCUMENTS

| | | | | |
|---|---|---|---|---|
| 592,969 A * | 11/1897 | Hanretty | ................ | B66D 3/04 254/390 |
| 711,786 A * | 10/1902 | Poulson | ................ | B66D 3/04 474/140 |
| 776,052 A * | 11/1904 | Geary | ................ | B66D 3/046 254/405 |
| 2,079,299 A * | 5/1937 | McKissick | ............ | B66D 3/046 254/416 |
| 2,174,427 A * | 9/1939 | Alfred | ................ | H02G 1/04 254/134.3 PA |
| 2,174,428 A * | 9/1939 | Taylor | ................ | H02G 1/04 254/134.3 PA |
| 2,174,429 A * | 9/1939 | Taylor | ................ | H02G 1/04 254/390 |
| 2,202,184 A * | 5/1940 | Berger | ................ | B66D 3/046 254/409 |
| 2,452,255 A * | 10/1948 | McKosky | ............ | D07B 7/06 57/58.3 |
| 2,696,740 A * | 12/1954 | Zatko | ................ | F16H 55/44 474/902 |
| 2,786,092 A * | 3/1957 | Gage | ................ | H02G 1/04 242/157 R |
| 3,565,401 A * | 2/1971 | Green | ................ | H02G 1/04 254/134.3 PA |
| 3,584,837 A * | 6/1971 | Reilly, Sr. | ............ | H02G 1/04 254/134.3 PA |
| 3,640,143 A * | 2/1972 | Krohn-Holm | ......... | B65G 39/02 474/174 |
| 3,720,399 A * | 3/1973 | Bozeman, Jr. | ............ | H05F 3/02 198/782 |
| 3,784,124 A * | 1/1974 | Shumate | ............ | A01K 89/015 242/297 |
| 3,908,962 A * | 9/1975 | Ross | ................ | H02G 1/02 254/134.3 R |
| 4,093,183 A * | 6/1978 | Lindsey | ............ | H01R 4/64 254/134.3 PA |
| 4,314,693 A * | 2/1982 | Hobbs | ................ | B66D 1/30 254/380 |
| 4,549,723 A * | 10/1985 | Castilano | ............ | B66D 3/046 254/405 |
| 4,586,676 A * | 5/1986 | Johnston | ............ | B65H 75/4402 242/615.3 |
| 5,056,760 A * | 10/1991 | Jorgensen | ............ | B66D 3/046 254/402 |
| 5,277,350 A * | 1/1994 | Thornbury, Jr. | ...... | A63H 27/002 242/390.8 |
| 5,370,326 A * | 12/1994 | Webb | ................ | B65H 54/547 242/395 |
| D367,143 S * | 2/1996 | Sauber | ................ | D34/29 |
| 5,996,971 A * | 12/1999 | Crouse | ................ | E21B 19/22 254/362 |
| 6,398,147 B1 * | 6/2002 | Fredrickson | ......... | B65H 75/305 242/390.8 |
| 7,234,501 B1 * | 6/2007 | Park | ................ | E06B 9/264 160/90 |
| 7,874,543 B2 * | 1/2011 | Theisen | ................ | H02G 7/10 254/134.3 R |
| 8,317,125 B2 * | 11/2012 | Lindley | ................ | B65H 75/28 242/587.3 |
| 10,003,178 B2 * | 6/2018 | Ferguson | ............ | H02G 11/02 |
| 2010/0300826 A1 * | 12/2010 | Peterson | ............ | H02G 11/02 242/397.5 |
| 2017/0170642 A1 * | 6/2017 | Faircloth | ............ | B60M 1/26 |
| 2018/0242438 A1 * | 8/2018 | Lin | ............ | H05F 3/02 |

FOREIGN PATENT DOCUMENTS

| | | | |
|---|---|---|---|
| CN | 105140862 B | * | 3/2017 |
| CN | 106684791 A | * | 5/2017 |
| JP | 2754070 B2 | * | 5/1998 |

* cited by examiner

UNITARY FASTENER AND CABLE GUIDANCE DEVICES FOR HELICOPTER BLOCK PULLEYS AND METHODS OF ASSEMBLY AND USE

CROSS REFERENCE TO RELATED APPLICATIONS

The present application claims priority to, incorporates herein by reference, and is a non-provisional of, U.S. Provisional Patent Application No. 62/942,175 filed Dec. 1, 2019 by inventors Edward Youngerman, Anthony Pickart, Servando Tones, and Andrew Finn, and entitled Traveler Ground Components, Assemblies, Systems, and Methods of Use ("the '175 application").

FEDERALLY SPONSORED RESEARCH OR DEVELOPMENT

None.

TECHNICAL FIELD

The present disclosure relates generally to pulley block assemblies for pulling cable, such as power lines, onto towers. More particularly, the present disclosure relates to cable guidance devices for pulley block assemblies.

BACKGROUND

The following background information may present examples of specific aspects known in the art (e.g., without limitation, approaches, facts, or common wisdom) that, while expected to be helpful to further educate the reader, are not to be construed as limiting the present invention or any of its embodiments.

It is known in the art that stringing power conductor cables within their transmission and distribution networks is performed with transmission networks, which carry very high voltage power cables over long distances from power plants to substations, and distribution networks which carry lower voltage power cables to the power consumer. Typically, such power conductor cables are strung along overhead transmission and distribution lines at the line structures or blocks. Often, a pilot line is strung through the blocks, either manually or by a helicopter. Then, the pilot line is exchanged by a single or bundled conductor running on the blocks. Finally, the conductor is sagged and then transferred from the blocks to clamps.

In many instances, the stringing of power conductor cables requires utilization of a stringing block having a sheave wheel. Such transmission stringing sheaves generally use wheels having a diameter ranging from about twelve inches to forty-two inches. Often, the sheaves use aluminum wheels in an aluminum frame. The wheel slowly feeds the line along the tops of the towers, often through use of a pilot line that guides the end of the conductor cable.

Other designs have involved helicopter block pulley systems utilizing multiple pulleys or sheaves for stringing conductor cables across transmission towers. However, a need remains for improvements to known helicopter block pulley systems, because they are complex, involve numerous moving parts, and the cable sometimes rides out or over the side of the pulleys or sheaves of the system.

SUMMARY

The present invention elegantly overcomes various drawbacks and limitations of past systems and provides numerous additional benefits as will be apparent to persons of skill in the art. For example, provided in various example embodiments is a simplified and improved unitary fastener and cable guidance device ("device") for a pulley block assembly, such as a unitary fastener and cable guidance device formed from a single piece of material, the device comprising: a pair of discs, each disc comprising an inner side, an outer side, a disc rim, and a disc hub forming an annular depression between the pair of discs, the annular depression defining a minimum outer diameter about an axis; and a cantilevered axle comprising an outer axle diameter, an outer end, and an opposing inner end integral to the outer side of one of the discs, the cantilevered axle having a threaded axle borehole formed therein about the axis; the outer axle diameter being equal to or greater than the minimum outer diameter.

In various example embodiments the disc rim comprises a curved peripheral edge. In various example embodiments the outer side of one of the discs forms a cavity. In various example embodiments the cavity comprises an axially extending wall comprising a hexagonal shape. In various example embodiments the annular depression and the inner side of the discs form a smooth junction. In various example embodiments the cantilevered axle of the device is configured to attach to an arm portion of a pulley block assembly comprising a sheave wheel so that the device will be aligned with the sheave wheel to rotatably direct a cable in a circumferential direction to the sheave wheel.

Also provided in various example embodiments is a pulley block assembly comprising: the unitary fastener and cable guidance device as described herein, rotatably connected to an arm assembly that is rotatably connected to a frame to which a sheave wheel having a circumferential groove is rotatably connected, the unitary fastener and cable guidance device operable to rotatably direct a cable in a circumferential direction toward, and in alignment with, the circumferential groove in the sheave wheel.

In various example embodiments the unitary fastener and cable guidance device is rotatably connected to the arm assembly with a tamper-resistant flower nut having a tapered outer surface and a curvilinear inner wall surface having a shape configured to engage a correspondingly-shaped tool, the tamper-resistant flower nut rotationally engaged with a threaded fastener fastened to the threaded axle borehole.

In various example embodiments the arm assembly rotatably is connected to the frame with a tamper-resistant flower nut having a tapered outer surface and a curvilinear inner wall surface having a shape configured to engage a correspondingly-shaped tool, the tamper-resistant flower nut rotationally engaged with a threaded fastener fastened to a hub attached to the frame. In various example embodiments the hub is coaxial with an axle about which the sheave wheel is configured to rotate.

In various example embodiments the pulley block assembly further comprises a grounding attachment extending from the arm assembly in a direction away from the unitary fastener and cable guidance device.

In various example embodiments the pulley block assembly further comprises a spring-loaded mechanism connected at a first end to the frame and at a second end to the arm assembly, the spring-loaded mechanism configured to hold the arm assembly at a nominal angular position with respect to the frame. In various example embodiments the angular position of the arm assembly with respect to the frame can change when one or more springs in the spring-loaded mechanism are deflected by a radial force applied to the unitary fastener and cable guidance device.

Further provided in various example embodiments is a method of using a pulley block assembly, comprising the steps of: providing a pulley block assembly as described herein; directing a cable against the annular depression of the unitary fastener and cable guidance device and causing the unitary fastener and cable guidance device to rotate relative to the arm assembly; and directing the cable from the unitary fastener and cable guidance device into the circumferential groove in the sheave wheel and causing the sheave wheel to rotate relative to the arm assembly.

In various example embodiments the a method of using a pulley block assembly further comprises the steps of applying radial force to the unitary fastener and cable guidance device with the cable; deflecting one or more springs in the spring-loaded mechanism; and causing the angular position of the arm assembly to change with respect to the frame.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Examples of the invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing aspects of examples of the invention.

FIG. 9A shows a perspective view, FIG. 9B shows an elevated side view, and FIG. 9C shows a frontal view, in accordance with example embodiments;

FIG. 10A shows a perspective view, FIG. 10B shows a top view, and FIG. 10C shows a bottom view, in accordance with example embodiments;

FIG. 11A shows a perspective view, FIG. 11B shows a front view, and FIG. 11C shows a rear view, in accordance with example embodiments;

FIG. 12A shows a perspective view, FIG. 12B shows a top view, and FIG. 12C shows a bottom view, in accordance with example embodiments;

FIG. 15A shows a perspective view of the flower nut, FIG. 15B shows a top view of the flower nut, FIG. 15C shows a perspective view of the socket, and FIG. 15D shows a top view of the socket, in accordance with example embodiments;

FIG. 16A shows a first flower nut and fastener fastening the device to a first arm assembly, and FIG. 16B shows a second flower nut and fastener fastening a frame and sheave wheel axle assembly to a second arm assembly, in accordance with example embodiments;

FIG. 17A shows a perspective view, FIG. 17B shows a top view, and FIG. 17C shows a bottom view, in accordance with example embodiments;

FIG. 20A shows a twenty-two inch sheave wheel, and FIG. 20B shows a twenty-eight inch sheave wheel, in accordance with example embodiments;

FIG. 21A shows an elevated side view, and FIG. 21B shows a top view, in accordance with example embodiments;

FIG. 24A shows a perspective view, FIG. 24B shows a top view, and FIG. 24C shows a bottom view, in accordance with example embodiments;

FIG. 27A shows a perspective view, FIG. 27B shows a top view, and FIG. 27C shows a bottom view, in accordance with example embodiments;

FIG. 30A shows an elevated side view, and FIG. 30B shows a top view, in accordance with example embodiments.

Figure 1:
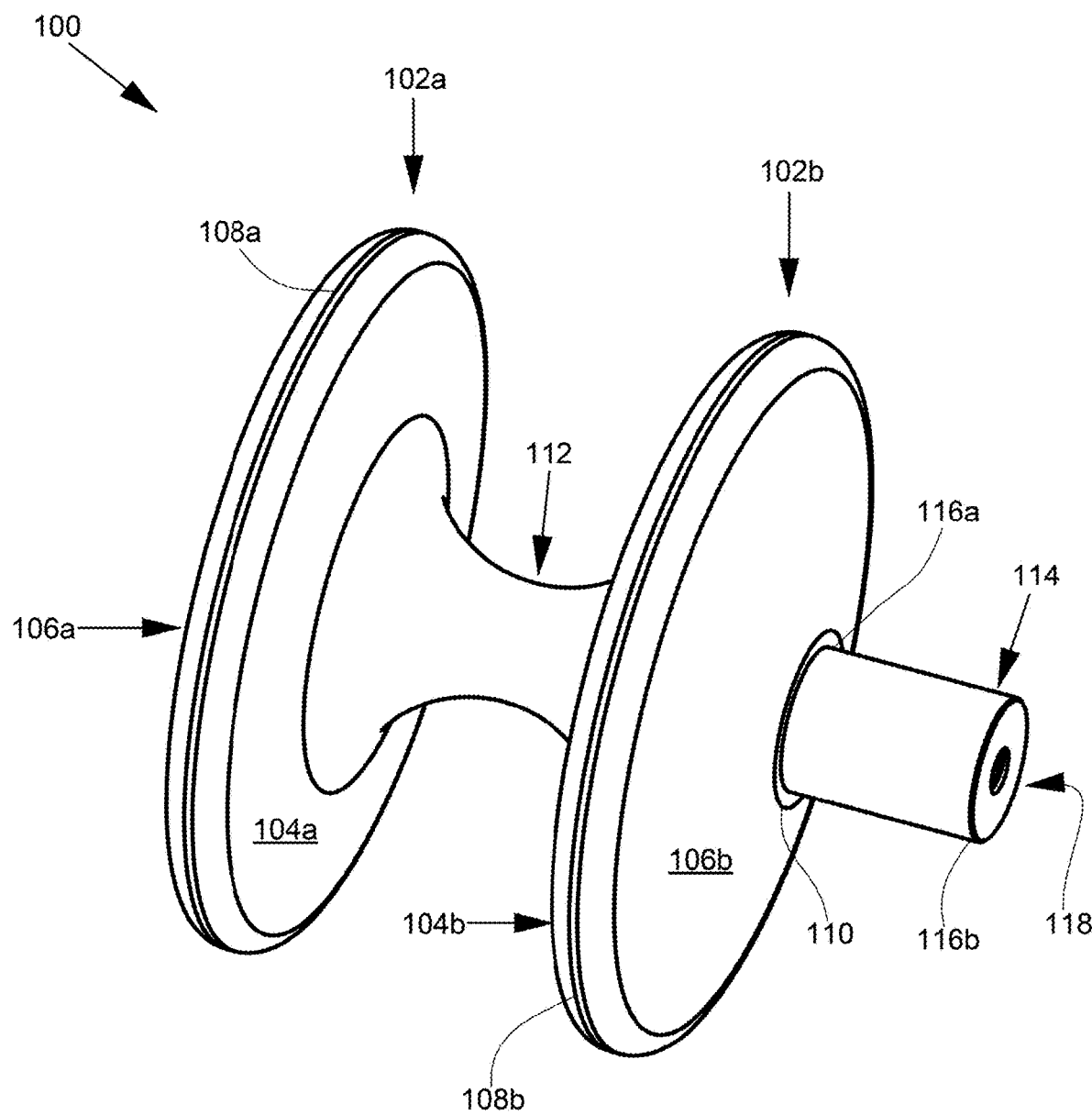
FIG. 1 illustrates a perspective view of an exemplary unitary fastener and cable guidance device, in accordance with example embodiments.

Additionally, the figures, drawings, and photographs in the '175 application, which is incorporated herein by reference for all that it teaches, including its own incorporations by reference, illustrate certain aspects of example embodiments.

The invention is not limited to what is shown in these example figures. The invention is broader than the examples shown in the figures and covers anything that falls within any of the claims.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as comprising the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted. Specific dimensions and other physical characteristics relating to the embodiments disclosed herein are therefore not to be considered as limiting, unless the claims expressly state otherwise.

Turning to FIGS. 1-31, shown are various aspects of an example unitary fastener and cable guidance device 100 for pulley block assembly 200 and method 3100 of assembly according to various example embodiments. The example unitary fastener and cable guidance device 100, hereafter device 100, is a unitary component that aligns with, and feeds, a cable to a pulley block assembly 200. The device 100 is a unitary component having a pair of discs 102a-b that are disposed in a parallel, spaced-apart relationship, each disc (102a, 102b) comprising an inner side (104a, 104b), an outer side (106a, 106b), a disc rim (108a, 108b), and a disc hub forming an annular depression 300 between the pair of discs 102a-b, the annular depression 300 defining a minimum outer diameter 302 about the axis of the device 100. The device 100 may also comprise an integral, and centrally disposed, cantilevered axle 114 that extends outwardly from one of the discs 102b. The concentric disposition of the cantilevered axle 114 enables secure, aligned attachment to the pulley block assembly 200. The cantilevered axle 114 may define an outer axle diameter 304, an outer end 116b, and an opposing inner end 116a integral to the outer side 106b of one of the discs 102b, the cantilevered axle 114 forming a threaded axle borehole 118 about the axis of the device 100.

Furthermore, an arrangement of bolts and tamper-resistant flower nuts, e.g., 1504, 234, which are shown in FIGS. 15A-D, help create a tamper-resistant fastening means between the cantilevered axle and the sheave wheel, as well as across the components of the pulley block assembly 200. Through the bolts and flower nuts, e.g., 1504, 234, the device 100 simultaneously fastens and aligns with the sheave wheel 202. Once fastened in this manner, the device 100 rotatably feeds the cable to the sheave wheel 202, which in turn, strings the cable onto conductor towers.

In one example embodiment, the pulley block assembly 200 is a helicopter block pulley, used for stringing a cable, such as a power line, across the tops of conductor towers. However, the device 100 is compatible with any type of pulley mechanism that draws in and reels out cable, wire, stream, rope, pilot lines, tether, or the like, as would be apparent to persons of skill in the art.

As FIG. 1 illustrates, the device 100 utilizes a one-piece, unitary configuration, requiring no fasteners or moving parts between the different elements thereof. In one embodiment, the device 100 provides a pair of spaced-apart discs 102a-b that are joined at the center by a concave central portion 112. The discs 102a-b and concave central portion 112 rotate simultaneously to feed and guide the cable directly onto a sheave wheel 202 of the pulley block assembly 200. The concave central portion 112 is integral with the discs 102a-b, a separate axle component or fastening mechanisms are not required between the discs 102a-b. This one-piece configuration reduces number of components and moving parts, such as fasteners and bearing covers.

Furthermore, the device 100 may include a cantilevered axle 114 that integrally extends from an outer side of one of the discs 102a-b. The cantilevered axle 114 may serve as a central fastener to attach and align the device 100 with the pulley block assembly 200. The cantilevered axle 114 may serve as the fastening mechanism, rather than a separate fastener extending through a through-hole extending through the center of the device 100 (compare sheave axle 820 in FIG. 8), or some other external fastening mechanism.

Figure 3:
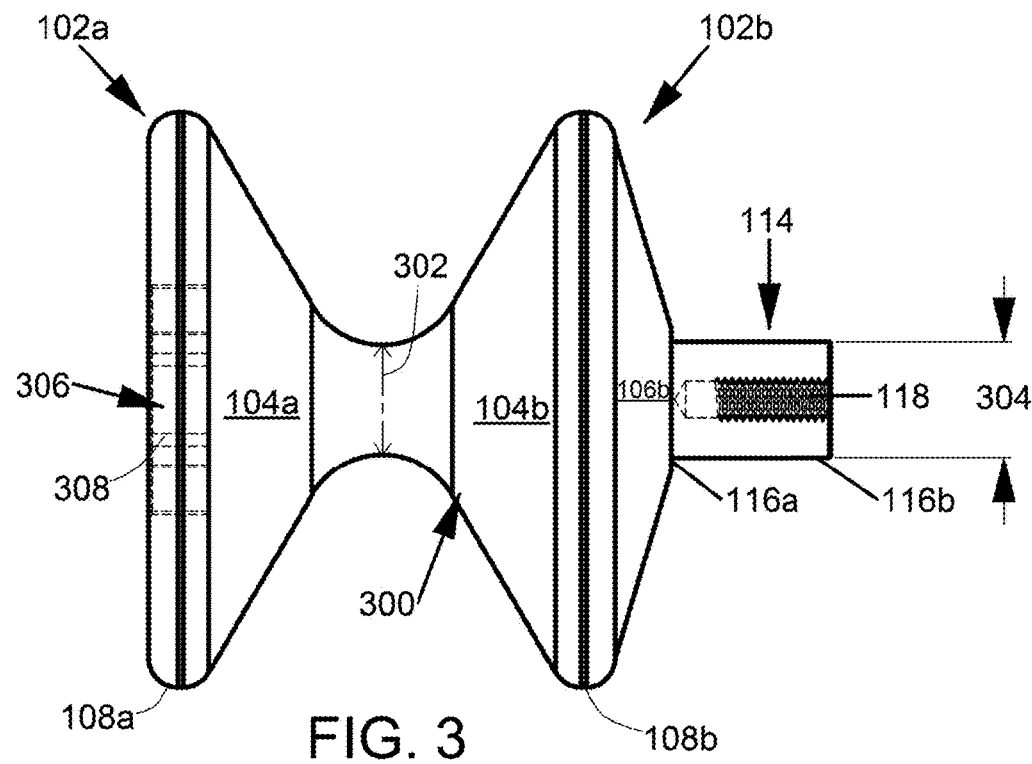
FIG. 3 illustrates a sectioned side view of the unitary fastener and cable guidance device, in accordance with example embodiments.
Figure 4:
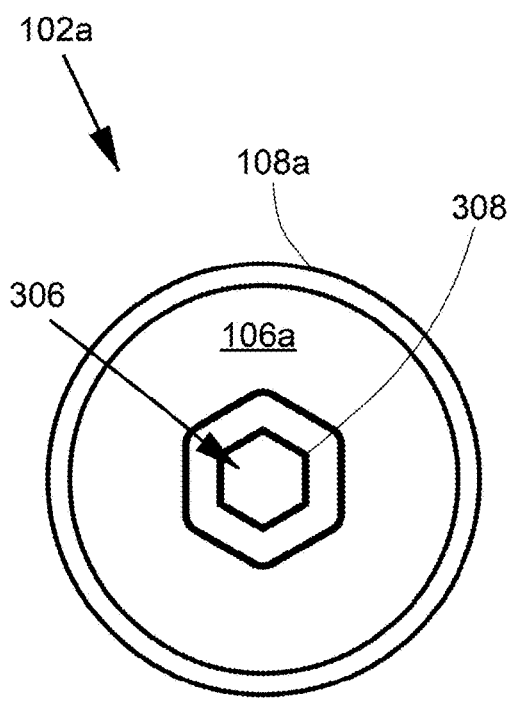
FIG. 4 illustrates a left side view of the unitary fastener and cable guidance device, in accordance with example embodiments.

FIG. 3 shows the device 100 with a pair of discs 102a-b arranged in a parallel relationship, and having substantially equal diameters and widths. In some embodiments, the device 100 may be constructed from aluminum, other metal alloys known in the art of stringing cable and wire, or any other suitable material. In various example embodiments, the device 100 may be scalable to any suitable size and different suitable shapes as would be apparent to persons of skill in the art, for instance to operate with different sized cables and/or different sized sheave wheels 202, for instance sheave wheels 202 having a twenty-two inch or a twenty-eight inch diameter.

The discs 102a-b are spaced-apart and coaxial, with a concave central portion 112 extending between the general central region of the discs 102a-b. A cable can radially ride in the concave central portion 112, while the discs 102a-b serves as a barrier to maintain the cable on the concave central portion 112. The junction between discs 102a-b and the concave central portion 112 is smoothly curved. This hyperbolic configuration enables a cable to smoothly draw in and reel out from the device 100, and onto the sheave wheel 202. The hyperbolic configuration also helps smooth the feeding of the cable as a helicopter creates jolting motions.

In some embodiments, each disc 102a, 102b comprises an inner side 104a, 104b and an opposing outer side 106a, 106b. The inner sides 104a-b of the discs 102a-b face each other in a parallel arrangement. The outer sides 106a-b of the discs face away from each other, with one outer side 106a of one disc 102a defining a hexagonal leaf shaped cavity which attachment members may be attached thereto, and the outer side 106b of the other disc 102b being integrally joined with the cantilevered axle 114.

In some embodiments, the discs 102a-b also include a disc rim 108a, 108b that serves as the peripheral portion, circumference. In one example embodiment, the disc rim 108a-b comprises a curved peripheral edge that creates a smooth, rounded edge to the discs 102a-b. The cantilevered axle 114 extends from a generally central region 110 of the disc 102b, and is concentric with both discs 102a-b.

In one embodiment, the inner sides 104a-b of the discs 102a-b, at or near the generally central regions 110 of the discs 102a-b form an annular depression 300. The annular depression 300 is on the inner side, and thus is formed between the pair of discs 102a-b. The annular depression 300 defines a minimum outer diameter 302 about a concave central portion 112. As discussed herein, the minimum outer diameter 302 about the concave central portion 112 can be smaller than the outer axle diameter 302 that defines the cantilevered axle 114, since the fastening means occurs at the cantilevered axle 114, and not at the concave central portion 112 between the discs 102a-b. Also, the cantilevered axle 114 may support greater stress.

Figure 5:
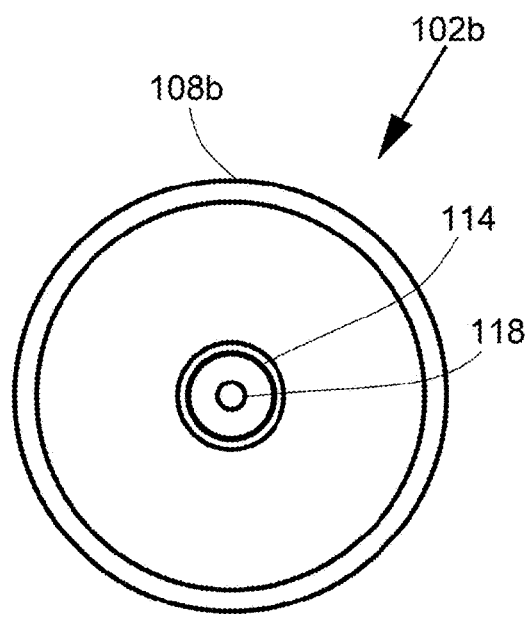
FIG. 5 illustrates a right side view of the unitary fastener and cable guidance device, in accordance with example embodiments.
Figure 6:
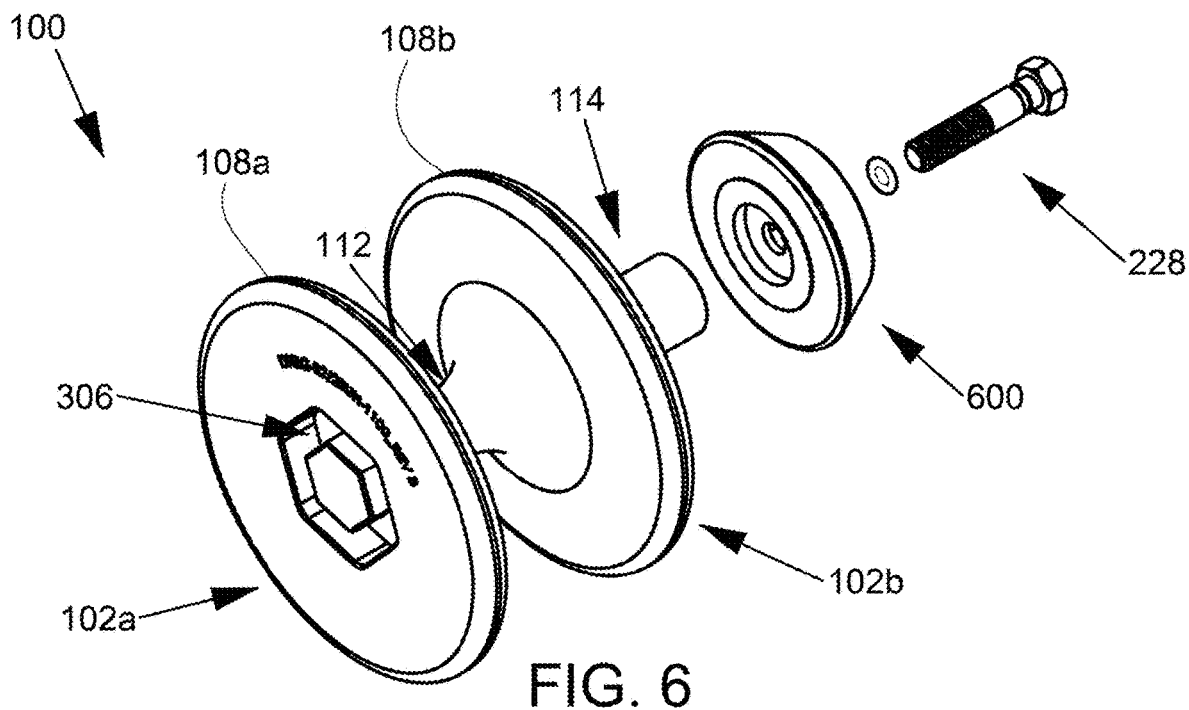
FIG. 6 illustrates a perspective view of a block member in position to fasten to an exemplary cantilevered axle of the unitary fastener and cable guidance device, in accordance with example embodiments.

Looking again at FIG. 3, the cantilevered axle 114 extends axially from the outer side of one of disc 102b, opposite the disc that forms the cavity. The cantilevered axle 114 has an outer end 116b, and an opposing inner end 116a that is integral to the outer side 106b of the disc 102b. For example, FIG. 5 illustrates a front view of the cantilevered axle 114, showing the concentric disposition relative to the disc 102b, and the cantilevered axle 114 integral with the discs 102a-b.

Figure 2:
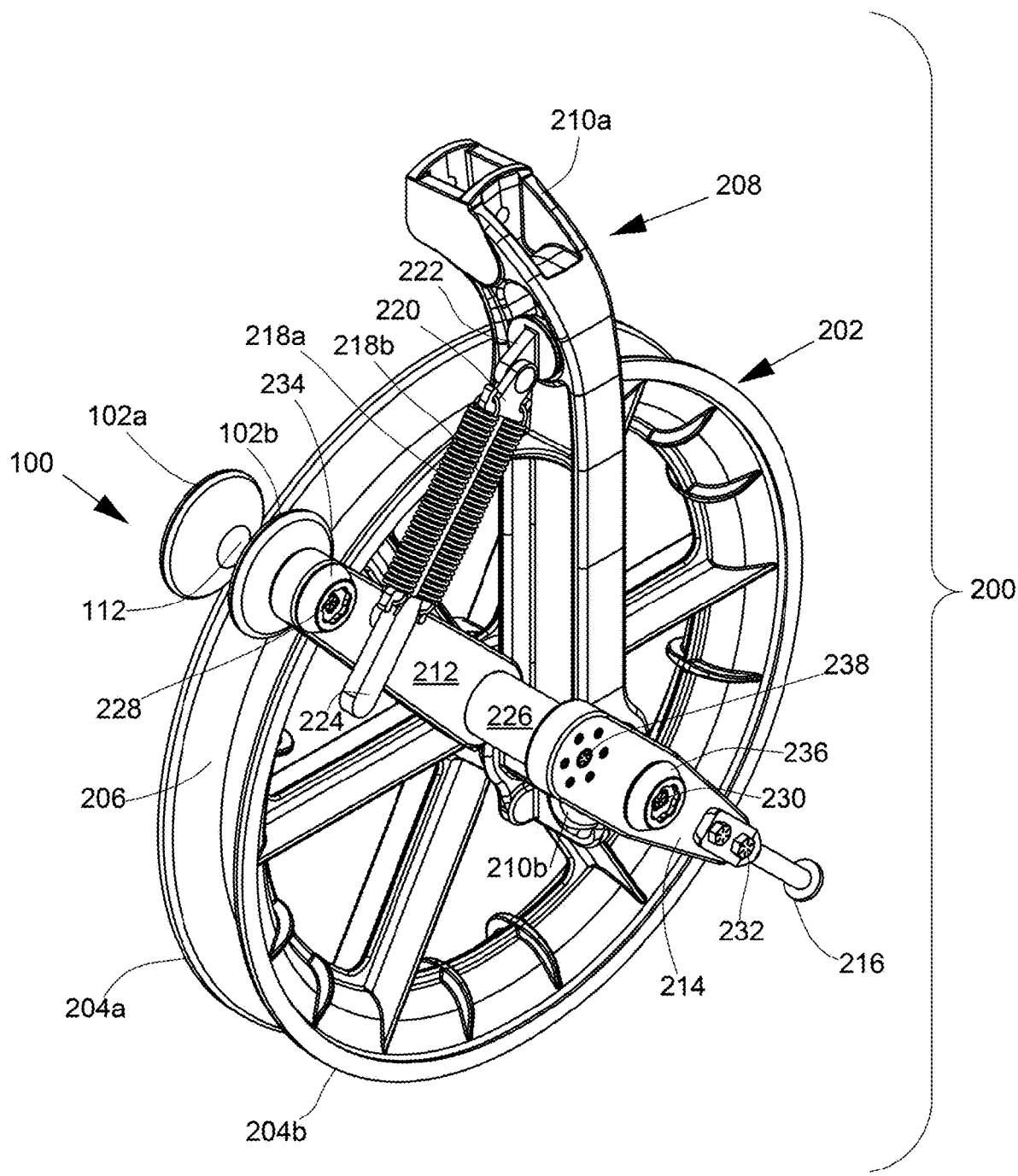
FIG. 2 illustrates a perspective view of an exemplary pulley block assembly operable with the unitary fastener and cable guidance device, in accordance with example embodiments.

In various example embodiments, the cantilevered axle 114 serves as a fastening mechanism to which a pulley block assembly 200 fastens (See FIG. 2). This central fastening means reduces the amount of moving parts and fasteners required for the pulley block assembly. For this purpose, a threaded axle borehole 118 is formed within the cantilevered axle 114 about the concave central portion 112. In various example embodiments, the threaded axle borehole 118 provides a threaded surface for a fastener 228, such as a screw, to threadably engage a flower nut 600 or similar retaining member configured to hold the device 100 on a first arm assembly 212 (e.g., FIG. 6). In one embodiment, the fastener 228 fastens a first arm assembly 212 from the pulley block assembly 200 to the cantilevered axle 114. In this manner, the cantilevered axle 114 serves as the connection point for attachment and alignment with the pulley block assembly 200.

Figure 7:
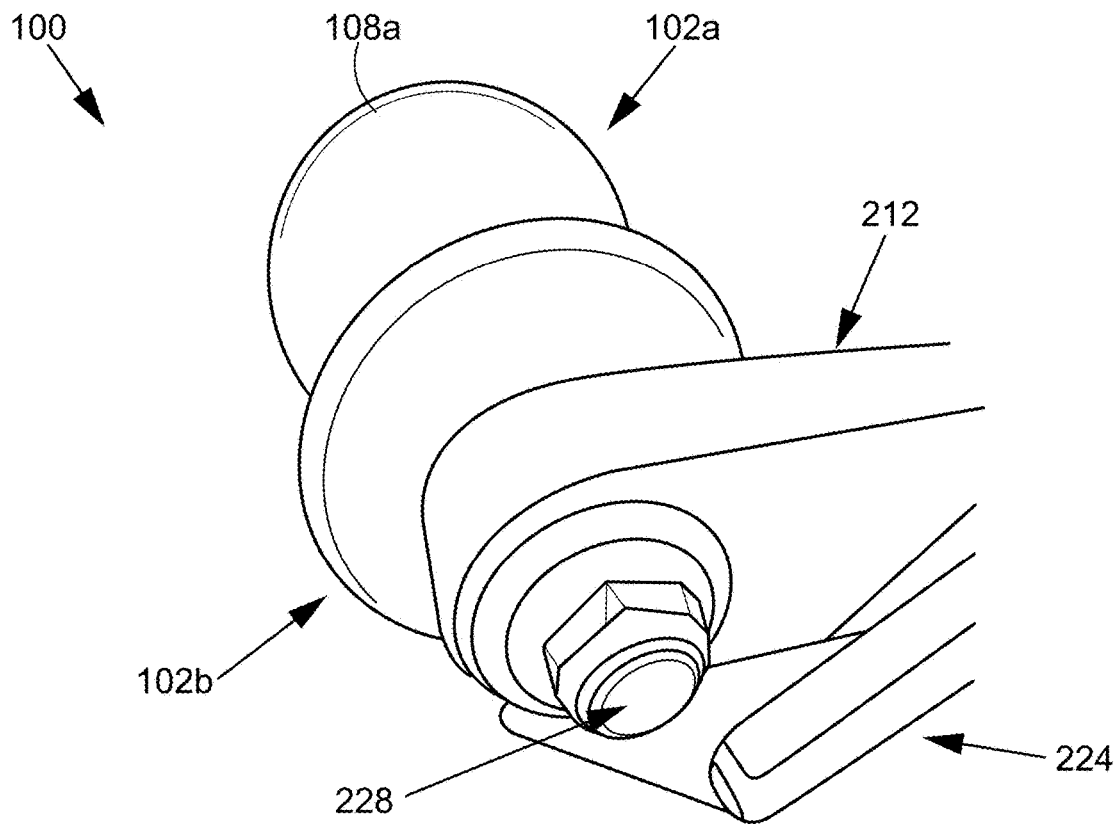
FIG. 7 illustrates a perspective view of an exemplary cantilevered axle of the unitary fastener and cable guidance device fastened to an arm assembly, in accordance with example embodiments.

By fastening with the cantilevered axle 114, the need to fasten the device 100 through the concave central portion 112 between the discs 102a-b, or through the cavity on the outer side of the disc, is negated. This serves to reduce the number of fasteners and moving parts. For example, FIG. 7 illustrates a fastener 228 connecting a first arm assembly 212 from the pulley block assembly 200 to the cantilevered axle 114 of the device 100. A threaded fastener 228 and flower nut create a tamper-resistant fastening arrangement between the device 100 and the pulley block assembly 200.

More specifically, since the cantilevered axle 114 contains the threaded portion 118 that is used for fastening the device 100 with the pulley block assembly 200, the concave central portion 112 does not need to contain the threaded portion 118, nor a through-hole (not shown), nor any other fastening component. Thus, the minimum outer diameter 302 of the concave central portion 112 can be configured to be smaller than it would otherwise need to be, for instance smaller than the outer axle diameter 304 of the cantilevered axle 114, which provides the fastening means (e.g., threaded portion 118, or some other internal or external threads or fastening elements) to attach the device 100 with the pulley block assembly 200 and consequently requires larger dimensions for housing the fastener components and withstanding the consequent stresses. Accordingly, the concave central portion 112 can be provided with an annular depression 300 having a smaller than normal minimum outer diameter 302, thereby allowing the sides 104a-b of the concave central portion 112 to be higher than normal for a given size device 100, which helps hold the cable more robustly within the device 100, and/or thereby allowing the overall outer dimensions of the device 100 to be smaller than normal while still handling the same size cable.

Looking now at FIGS. 3-6, a recessed hexagonal boss 306 is formed within the outer side of one disc 102a. The recessed hexagonal boss 306 comprises an axially extending wall 308 that defines a hexagonal shape. The hexagonal shape is sized to enable engagement by a tool, such as a socket. Such a tool can be used to engage recessed hexagonal boss 306 and assist with fastening and unfastening the device 100 from a fastener 228 that engages fastening means 118, thereby effectively turning the device 100 itself into a unitary fastener, while it also functions as a pulley or sheave with advantageous dimensional proportions.

Turning now to FIGS. 2 and 8 through 30B, the device 100 may be configured to be operable with the pulley block assembly 200. The pulley block assembly 200 is configured to reel in and draw out the cable or wire during stringing operations. The pulley block assembly 200, when used in conjunction with the device 100, provides numerous novel structures, such as bearings on which the device 100 rotates about; tamper-resistant fastening mechanisms, such as flower nuts and hexagonal bolt depressions; and tensioned springs for orienting grounding attachments at a desired position to maintain contact with the ground.

The device 100 is operable with a pulley block assembly 200 that is configured for rotatably carrying a cable in a circumferential direction onto a sheave wheel 202. Thus, the device 100 and the pulley block assembly 200 are fastenable to create a single operational unit. In some embodiments, the pulley block assembly 200 may include a helicopter block pulley, known in the art for drawing in and reeling out electrical cables, wire, pilot lines, or generally elongated electrical conductors, while attached to a helicopter through a helicopter frame 208. Through operation of the device 100 and the pulley block assembly 200, the cable can be strung across the tops of overhead transmission and distribution poles. Furthermore, the device 100 and the pulley block assembly 200 is operable for both manual and helicopter pilot line conductor stringing.

Figure 8:
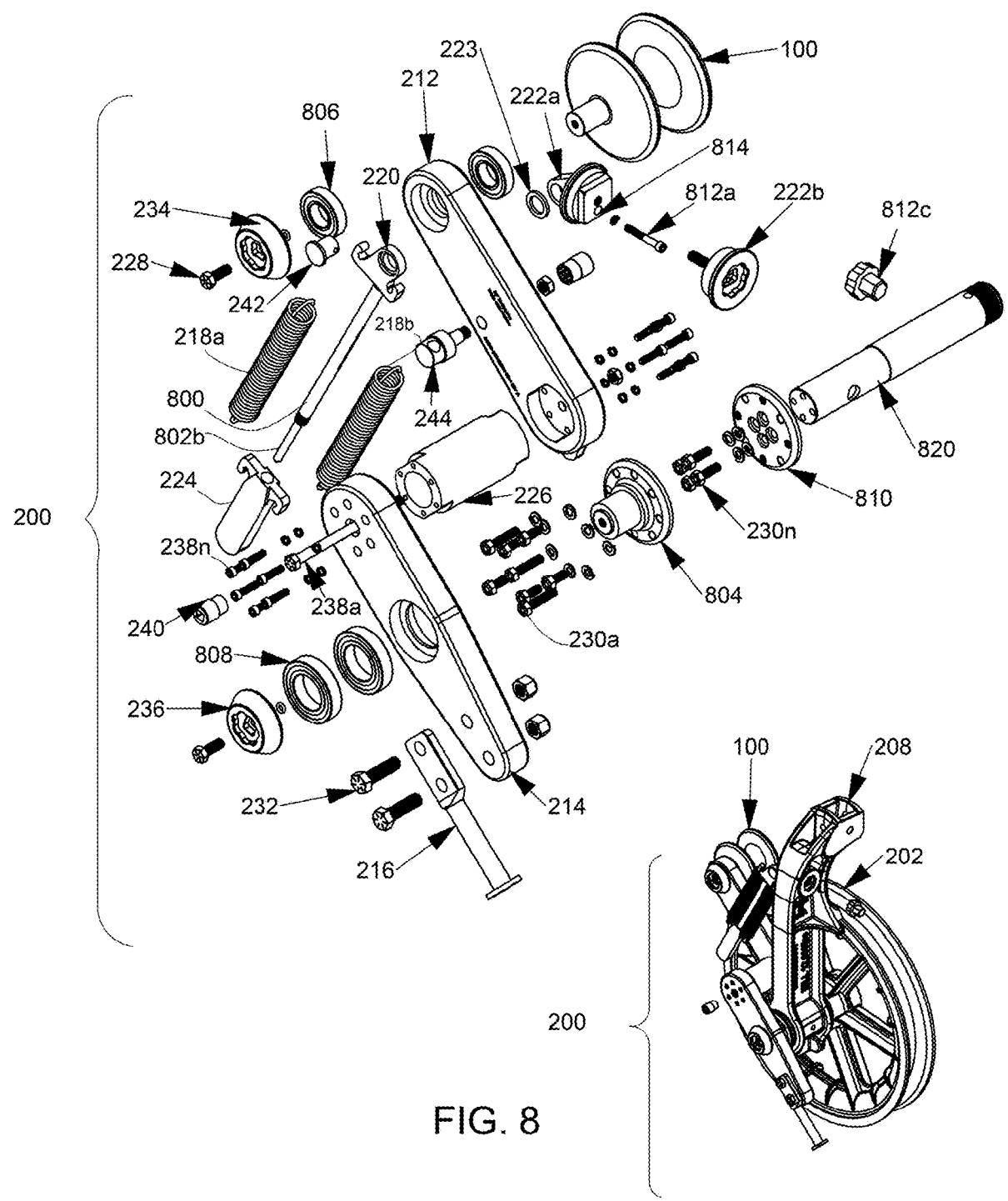
FIG. 8 illustrates a blow up view of the pulley block assembly, in accordance with example embodiments.
Figure 9A:
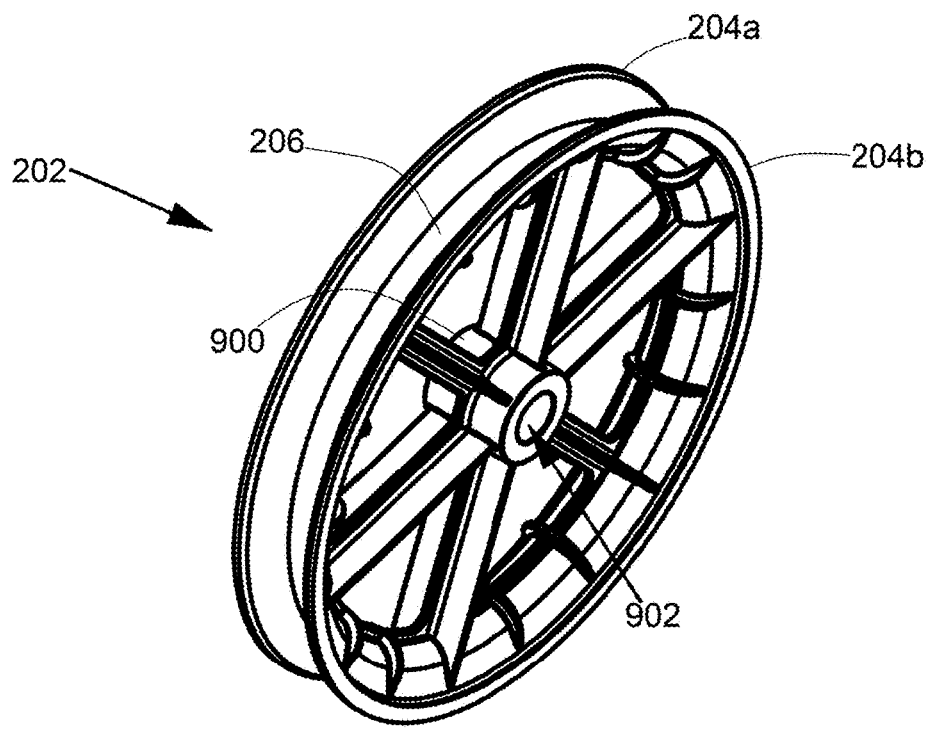
FIGS. 9A-9C illustrate an exemplary sheave wheel, where

Turning now to FIGS. 8 and 9A, the pulley block assembly 200 comprises a sheave wheel 202 that rotatably carries the cable that is received from the device 100. The sheave wheel 202 comprises a wheel hub 900 that defines therein a wheel hub hole 902 (which may contain wheel bearings as is known in the art (not shown)). The wheel hub 900 is generally concentrically disposed on the sheave wheel 202. In one embodiment, a sheave axle 820 passes through the wheel hub hole 902 of the wheel hub 900 and is attached with a frame 208 that extends from a first end 210*a* to a second end 210*b*. In this manner, the sheave wheel 202 is rotatable about the sheave axle 820 and the frame 208. In one example embodiment, the sheave wheel 202 is fabricated from aluminum, and may be supported by the frame 208, sometimes called a helicopter frame, which may also be formed from aluminum. The frame 208 may comprise a flange extending longitudinally across the first end 210*a* providing means for attaching one end of a spring system 218*a*-*b*, as discussed below. Any or all components of the pulley block assembly 200 may be iridized for conductivity, subject to required durability of wear surfaces.

Figure 9B:
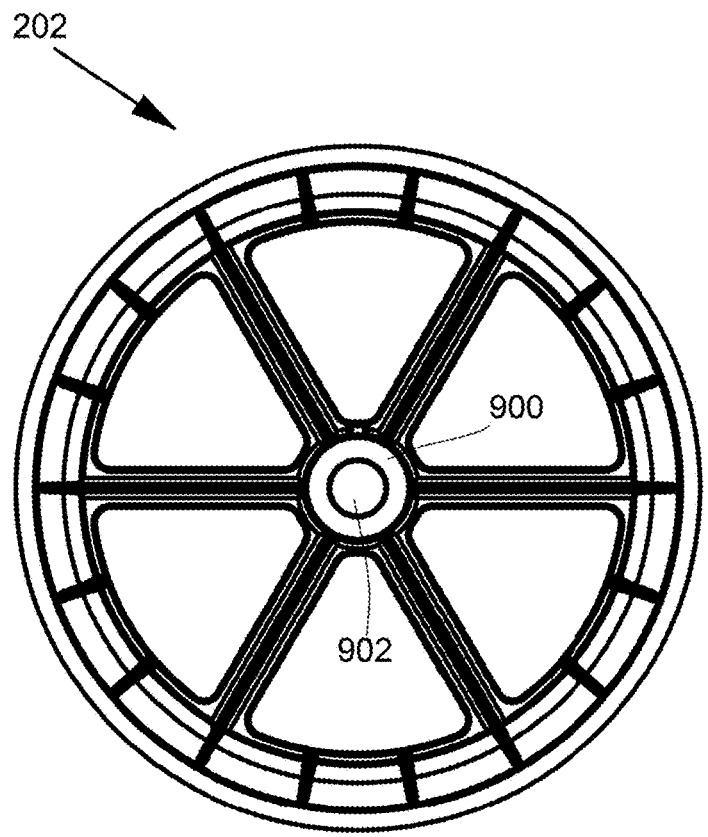
Figure 9C:
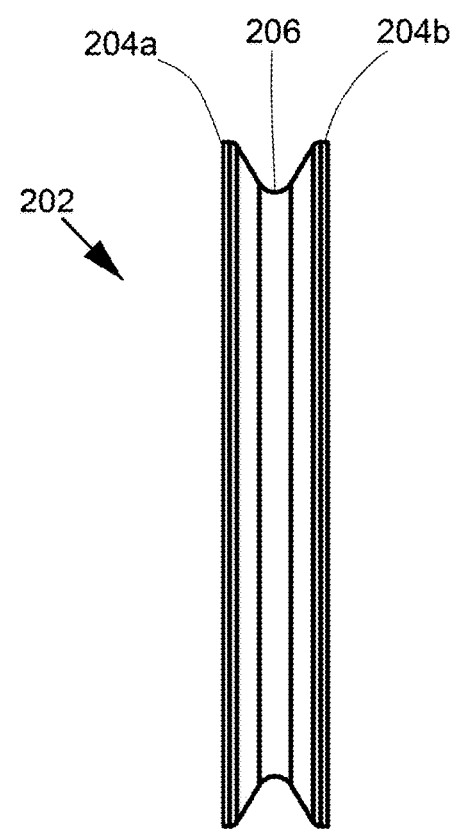
Figure 10A:
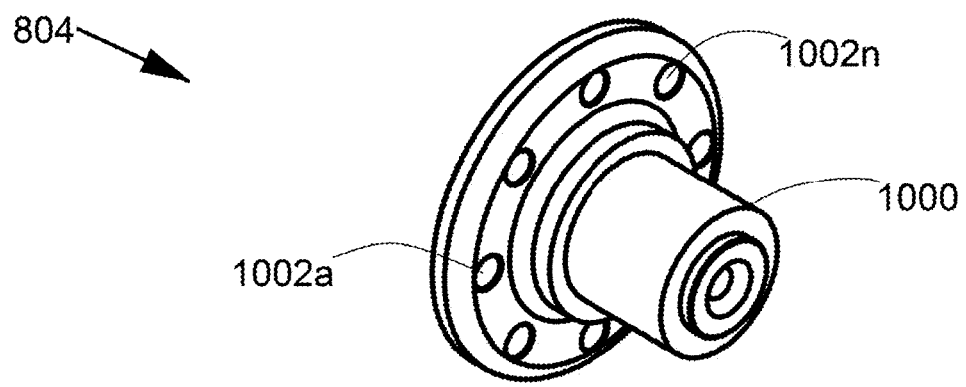
FIGS. 10A-10C illustrate an exemplary hub portion of a sheave axle assembly, where
Figure 10B:
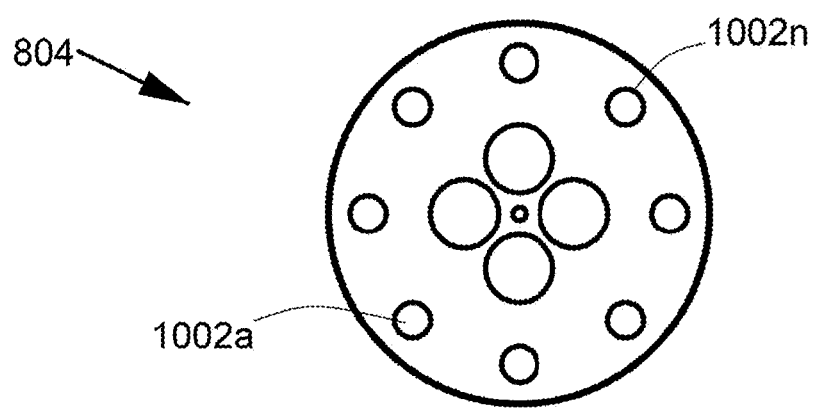
Figure 10C:
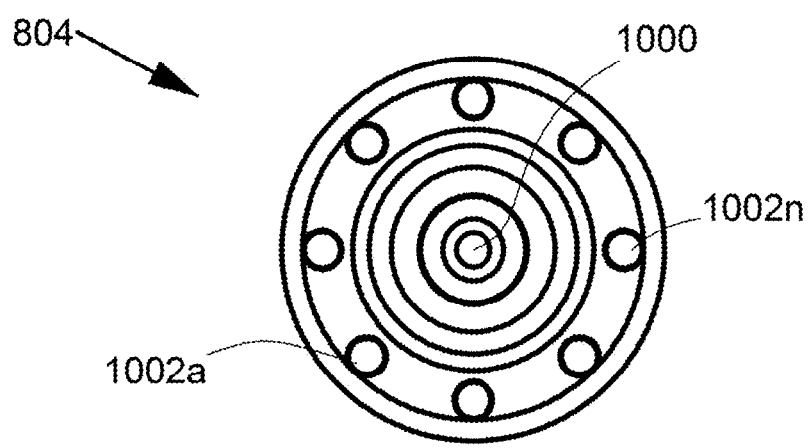
Figure 11A:
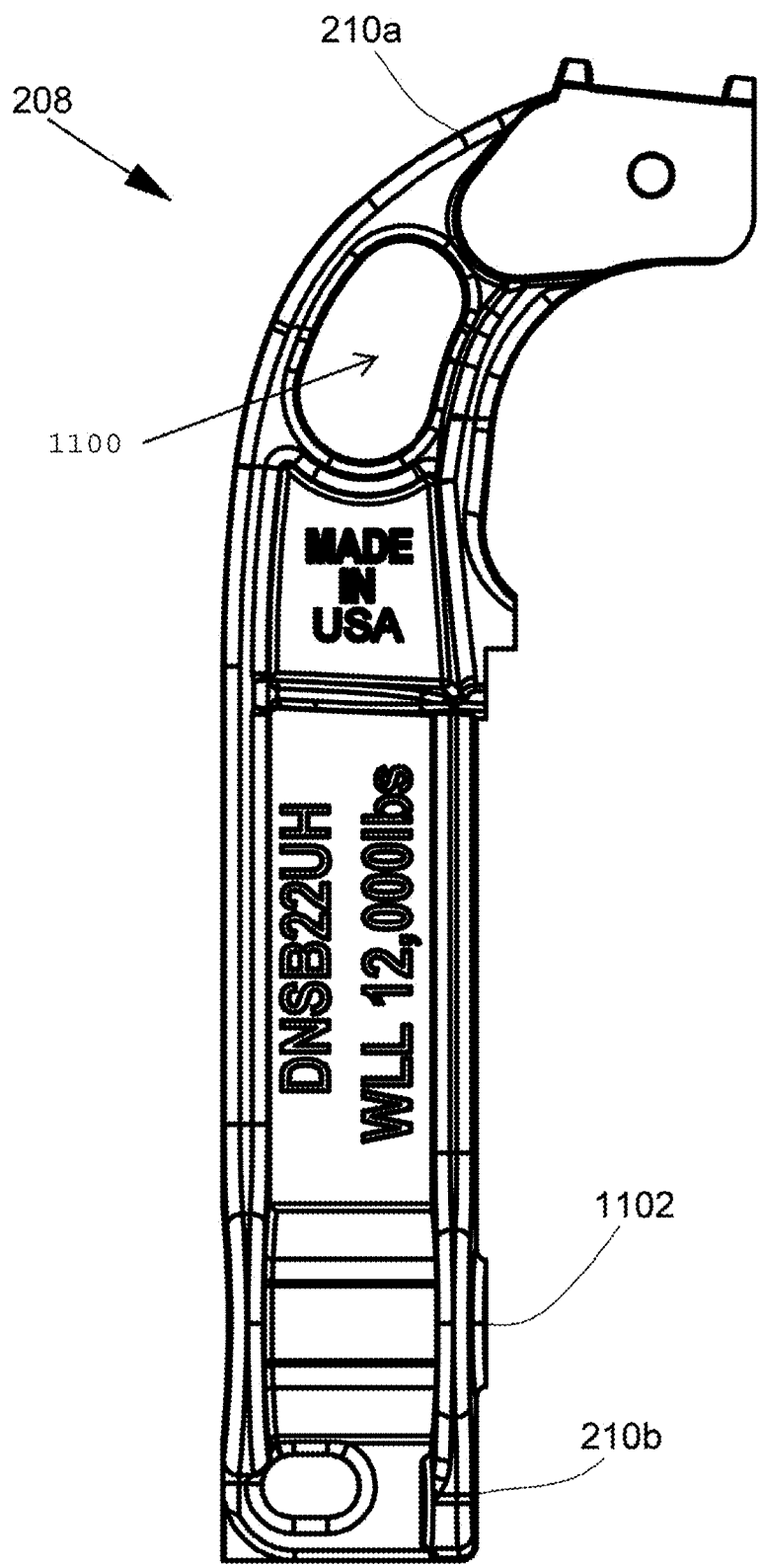
FIGS. 11A-11C illustrate an exemplary helicopter frame, where
Figure 11B:
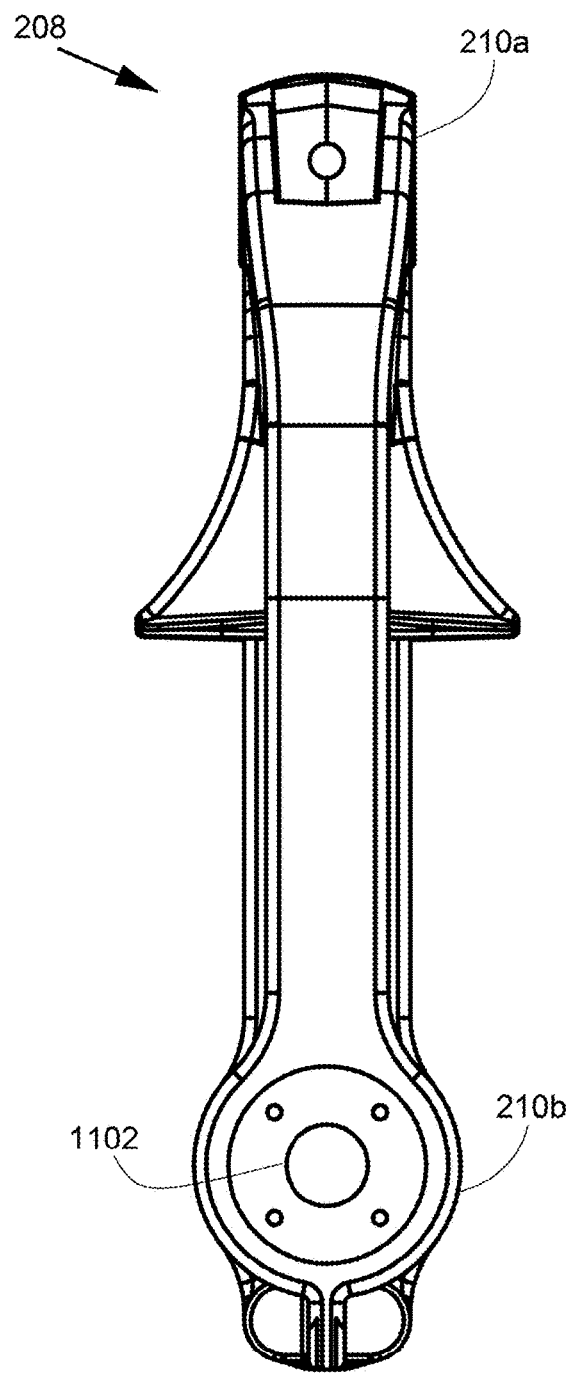
Figure 11C:
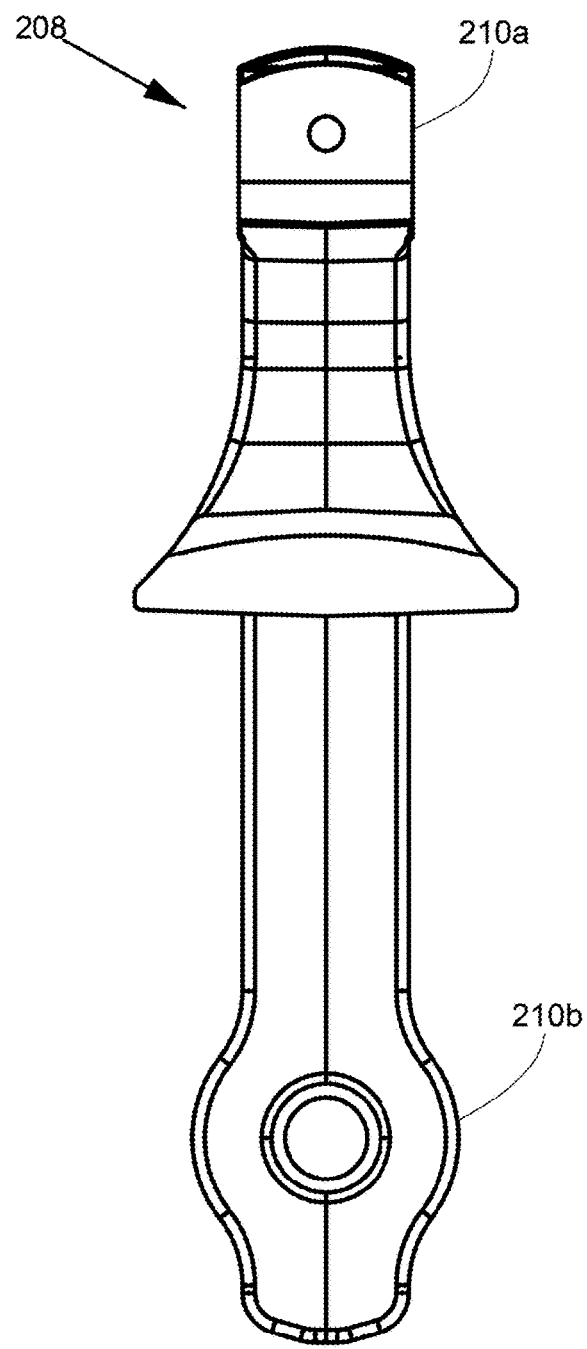

As FIG. 9B illustrates, the sheave wheel 202 comprises multiple spokes that extend from the wheel hub hole 902 to a peripheral region that carries the cable received from the device 100. The peripheral region of the sheave wheel 202 has a groove 206 that carries the cable. The groove 206 is configured to receive the cable from the cable guidance device 100 (See FIG. 9C). The groove 206 extends up to a pair of wheel rims 204*a*, 204*b*. As shown in FIG. 8, when the device 100 attaches to the pulley block assembly 200, the groove 206 is in alignment with the shaft of the discs 102*a*-*b*. The wheel rims 204*a*, 204*b* are in alignment with the disc rim of the discs 102*a*-*b*.

Figure 17A:
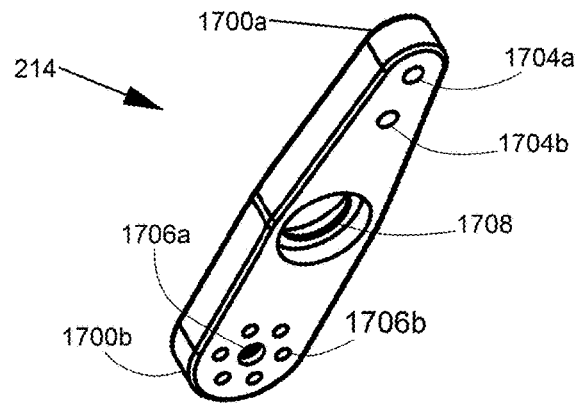
FIGS. 17A-17C illustrate an exemplary second arm assembly, where
Figure 17B:
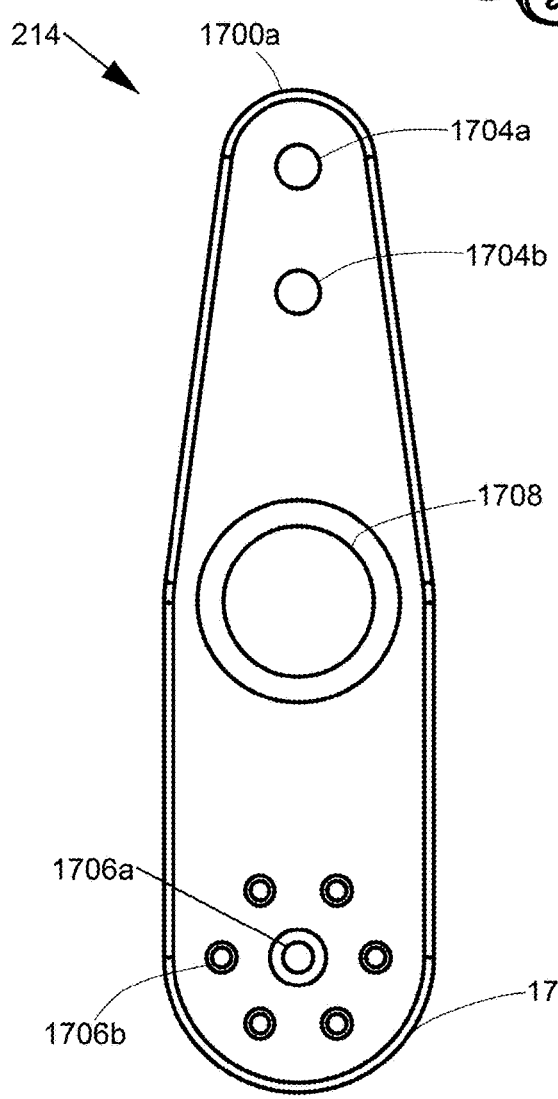
Figure 17C:
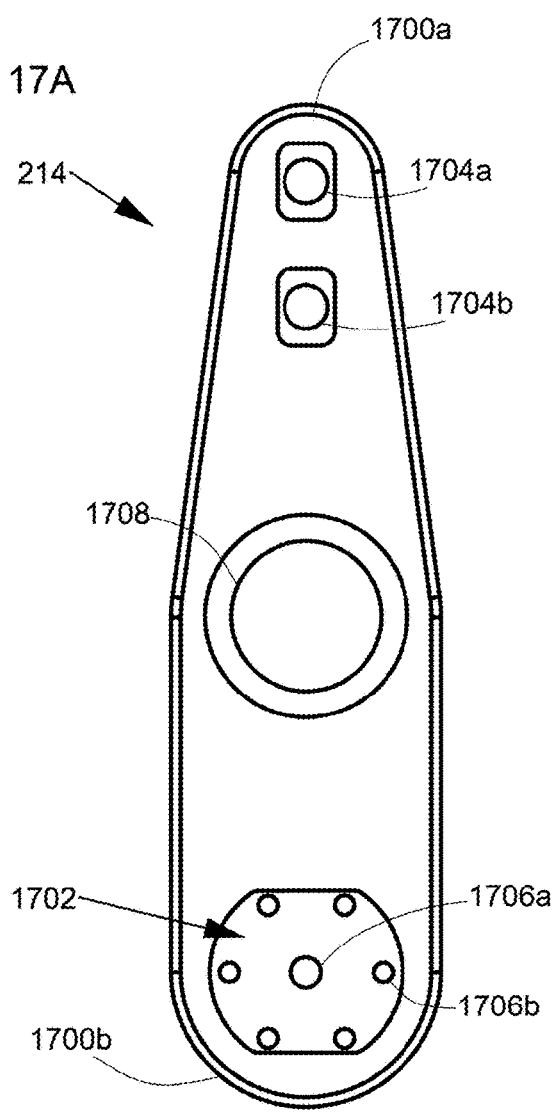

With reference to the example shown in FIGS. 8 through 14, a sheave axle 820 passes through the wheel hub hole 902 in the wheel hub 900 of the sheave wheel 202. The sheave axle 820 is fastened on one end with a second end 210*b* the frame 208 at frame hole 1102 via fasteners 230*n* passing through an axle plate 810 and the frame 208 into threaded holes in the end portion of the sheave axle 820. A sheave axle hub 804 attaches with the frame 208 via fasteners 230*a*-*n* passing through fastening holes 1002*a*-*n* into threaded holes in the frame 208. In some embodiments, the threaded portion of the fasteners described herein may include, without limitation, a collar, a socket head lock washer, and a nylon patch, for example. The sheave axle hub 804 may be configured as a flat disc with an extended member, such as central axle 1000, extending through one or more second bearings 808 positioned in the hub hole 1708 of the second arm assembly 214, which is shown in FIGS. 17A through 17C. A second flower nut assembly 236 attaches with the central axle 1000 of the sheave axle hub 804 to hold the sheave axle assembly (820, 810, 804) to the second arm assembly 214. The axle plate 810 may serve as a spacer between the frame 208 and the second arm assembly 214. In this manner, the sheave wheel 202 rotates freely about the frame 208 and the sheave axle assembly (820, 810, 804), while the second arm assembly 214 (and everything attached thereto) can rotate through a limited angle about the frame 208 and the sheave axle assembly (820, 810, 804).

For purposes of linking the device 100 with the pulley block assembly 200 in alignment with the sheave wheel 202, a first arm assembly 212 and a second arm assembly 214 are provided, which are connected together near their outer ends 1200*a*, 1700*b* in an offset manner by a tube coupler 226 and fasteners 238*a*-*n* passing through holes 1204*a*-*n* and 1706*a*-*b*. A grounding attachment 216 may be attached to the outer end 1700*a* of the second arm assembly 214 by fasteners 232 through holes 1704*a*-*b*.

Figure 12A:
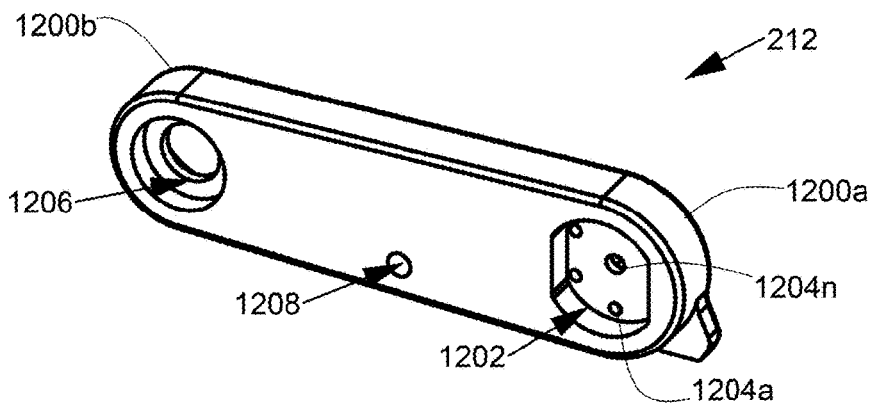
FIGS. 12A-12C illustrate an exemplary first arm assembly, where
Figures 12B, 12C:
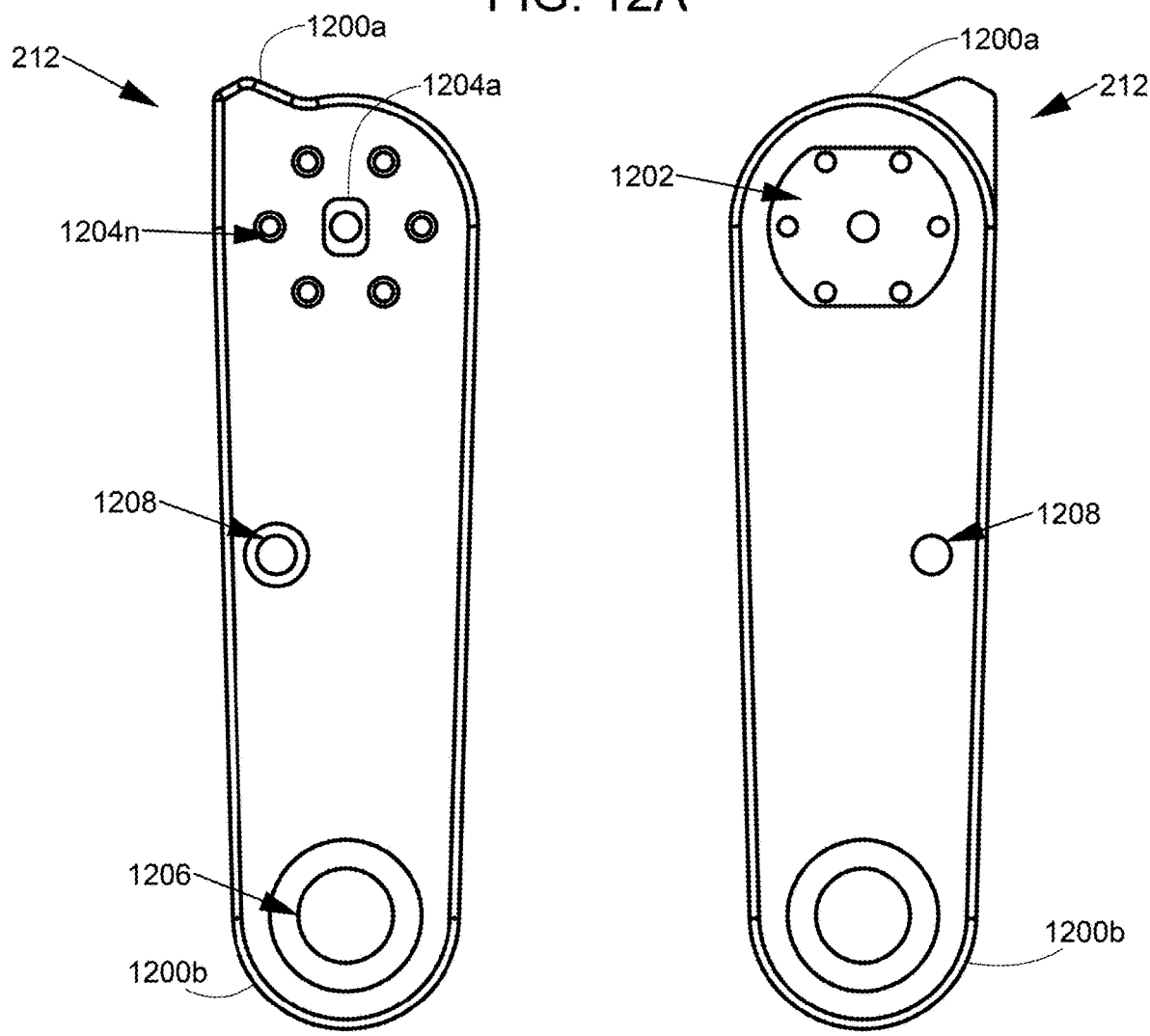
Figure 13:
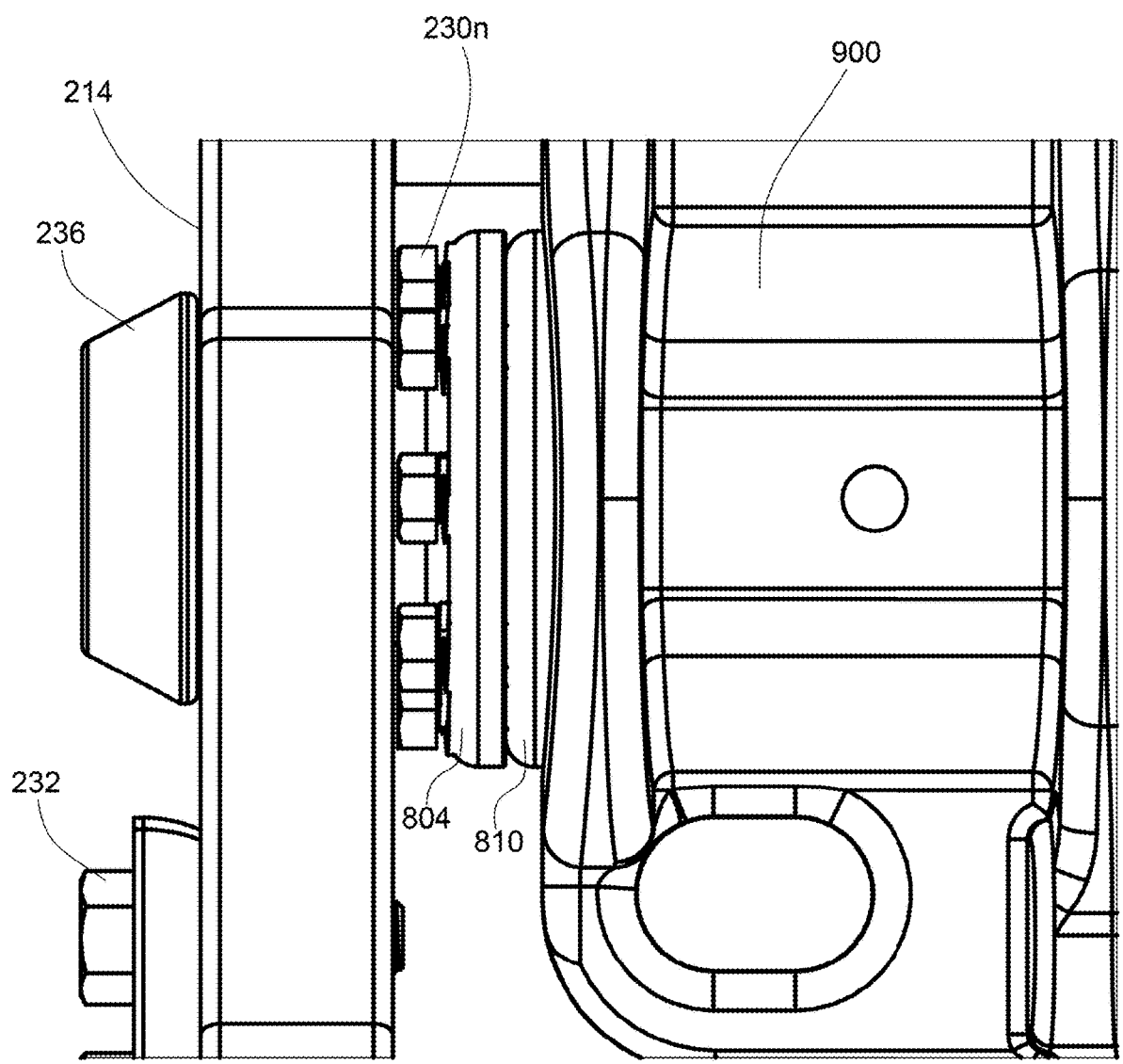
FIG. 13 illustrates a side perspective view of a first arm assembly fastened to the axle hub, in accordance with example embodiments.
Figure 14:
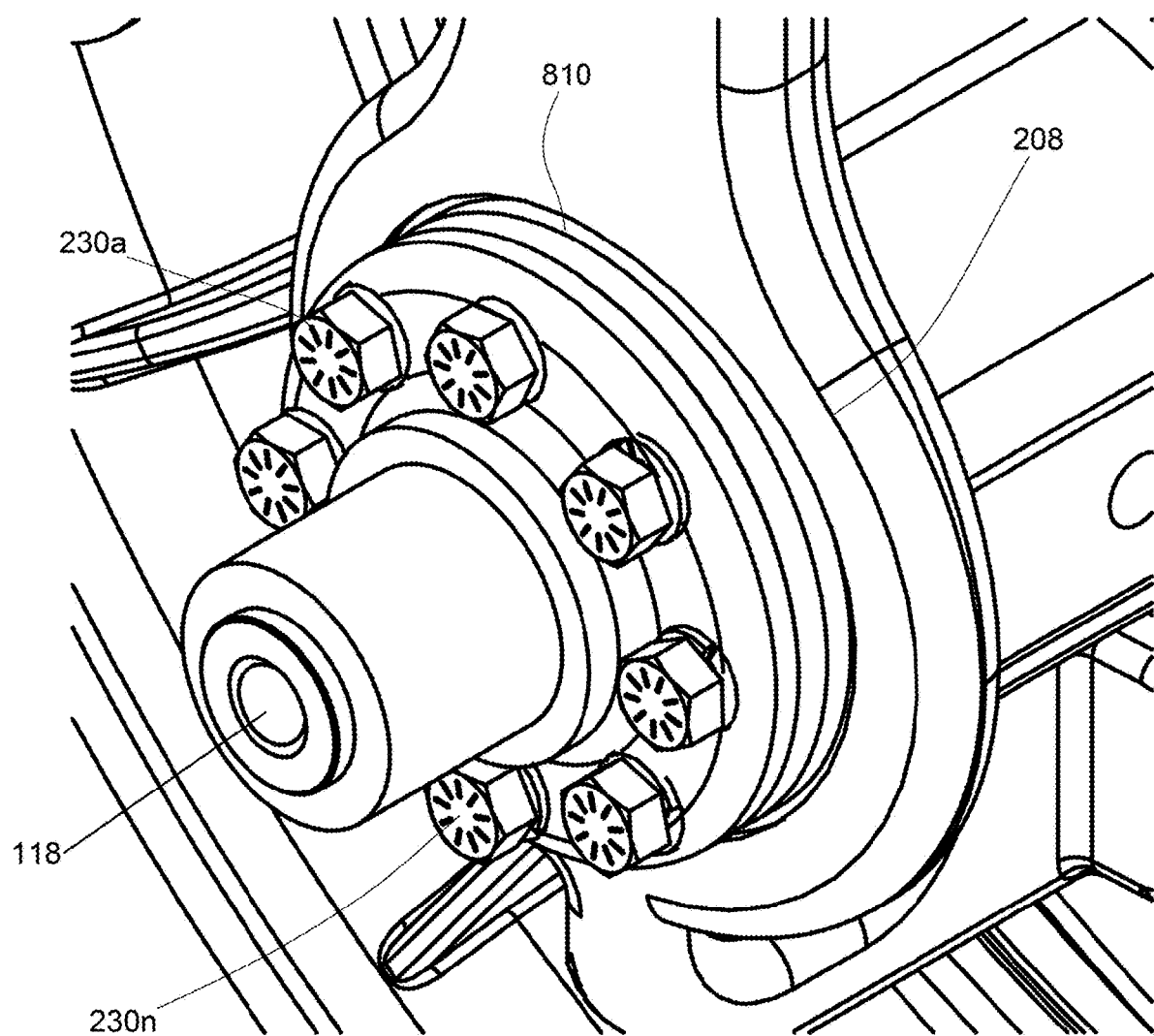
FIG. 14 illustrates a side perspective view of an exemplary fastener passing through fastening holes arranged around the axle hub, the axle plate, and into the frame, in accordance with example embodiments.
Figure 18:
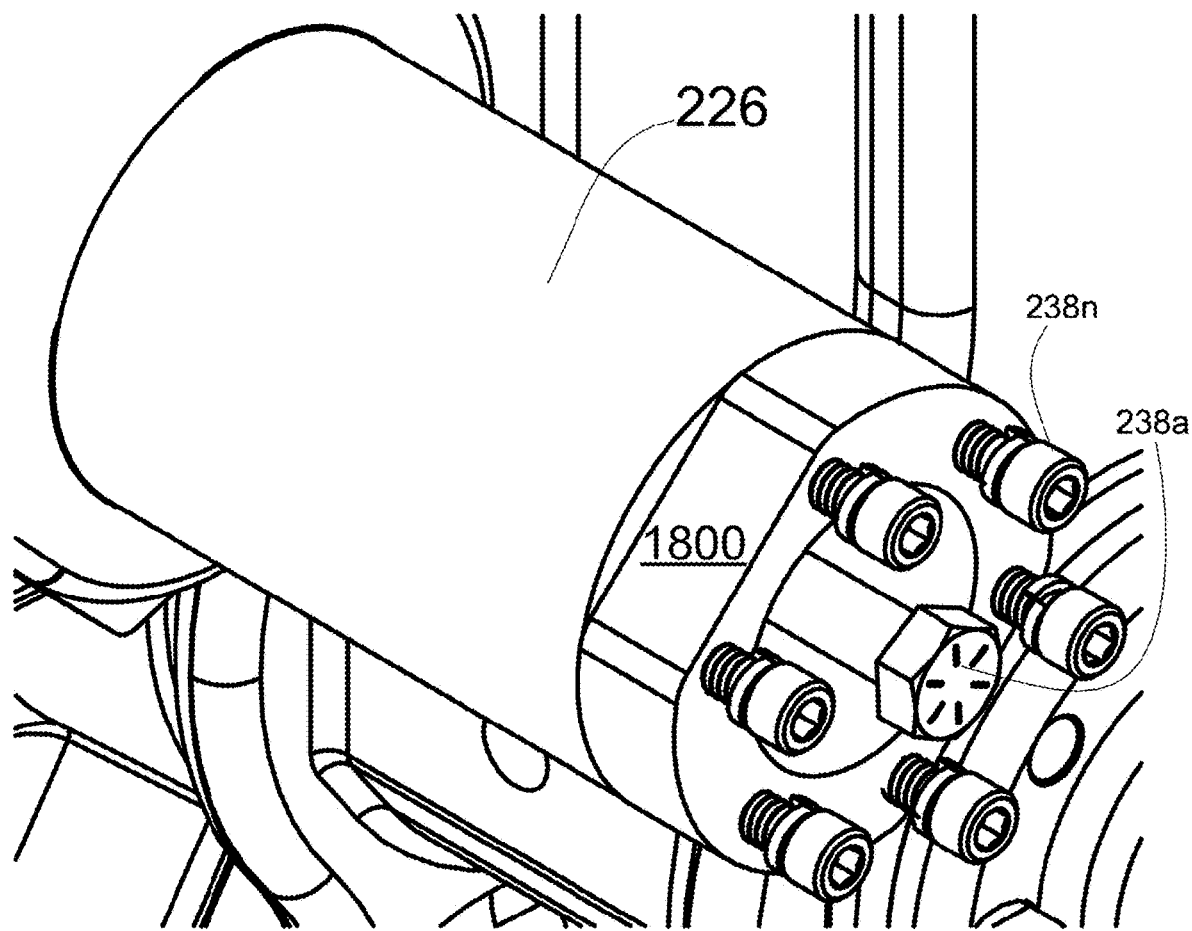
FIG. 18 illustrates a perspective view of an exemplary tube coupler with a flat surface end, in accordance with example embodiments.

FIG. 12A shows the first arm assembly 212 comprising an inner end 1200*a* and an outer end 1200*b*. The inner end 1200*a* of the first arm assembly 212 has a first depression 1202 that forms a generally circular shape with oppositely positioned flat sides, configured to fixedly engage a correspondingly-shaped flat surface end 1800 of tube coupler 226 (FIG. 18). In one embodiment, at least one first mount hole 1204*a*, 1204*n* forms inside the first depression 1202 (See FIG. 12C). The first arm assembly 212 joins the cantilevered axle 114 of the device 100 at the outer end 1200*b*, and specifically with a fastener 228 passing through the device mount hole 1206.

Centrally disposed along the first arm assembly 212 is a first spring mount hole 1208, used to fasten the lower spring mount 224 to the first arm assembly 212 (See FIGS. 8, 12C, 22, 23). In various example embodiments, the first arm assembly 212 may be nominally oriented at about a forty-five degree angle to the longitudinal axis of the frame 208 (or any other suitable angle, such as forty degrees, fifty degrees, thirty-five degrees, fifty-five degrees, thirty degrees, sixty degrees, or any angle there between), with the outer end 1200*b* oriented towards the device 100, and the inner end 1200*a* oriented towards the inner side 1700*b* of the second arm assembly 214 and the wheel hub 900. This orientation is maintained through use of a fastener 228, at least one second bolt 230*a*-*n*, and a springs 218*a*-*b* that generates spring tension (See FIG. 22) across the first arm assembly 212.

Figure 15A:
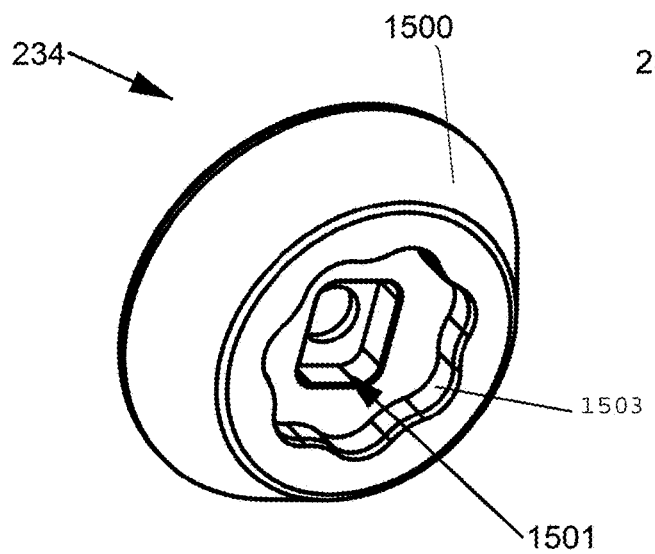
FIGS. 15A-15D illustrate views of a flower nut and socket tool, where

Looking back at FIG. 8, the pulley block assembly 200 comprises one or more first bearings 806 and one or more second bearings 808. The outer end of the cantilevered axle 114 of the device 100 is configured to concentrically receive the first bearings 806 which are mounted in the first hole 1206 of the first arm assembly 212, wherein the cantilevered axle 114, and thus the device 100, are held in place with respect to the first bearings 806 and the first arm assembly 212 by a first flower nut assembly (first flower nut 234 in combination with a fastener 228), for instance as shown in FIG. 16A. Similarly, as FIGS. 8 and 13 through 17C show, the central axle 1000 of the sheave axle hub 804 is configured to concentrically receive the second bearings 808 which are mounted in the arm hub hole 1708 of the second arm assembly 214, wherein the central axle 1000 of the sheave axle hub 804 (and thus also the frame 208, sheave axle 820, sheave wheel 202, and other components) are held in place with respect to the second bearings 808 and the second arm assembly 214 by a second flower nut assembly (second flower nut 236 in combination with a fastener 228), for instance as shown in FIG. 16B.

In one embodiment, the first bearing 806 helps rotation and stability of the device 100 in relation to the first arm assembly 212. The bearings 806, 808 may include, without limitation, a cylindrical roller bearing, a spherical roller bearing, a tampered roller bearing, a needle roller bearing, a plain bearing, a ball bearing, and a round ball bearing mechanism known in the art to facilitate rotation of mechanical components. In one example embodiment, an inlet formed in one or more of the bearings 806, 808 enables passage of a lubricant on and around the first bearing 806. In another example embodiment, one or more of the bearings 806, 808 are sealed.

In various example embodiments, the pulley block assembly 200 may comprise a tamper-resistant mechanism that helps prevent unauthorized or accidental removal of the fastener 228, or any of the other bolts or fastening mechanisms utilized by the pulley block assembly 200. As illustrated in FIGS. 8 and 15A, a first flower nut 234 may be utilized to surround the terminus of the fastener 228 and to cover the first bearing 806. The first flower nut 234, and its corresponding fastener 228 located with its terminus (or head) proximate interior surface 1501, together comprise a first flower nut assembly, which attaches the device 100 to the pulley block assembly 200.

Figure 15B:
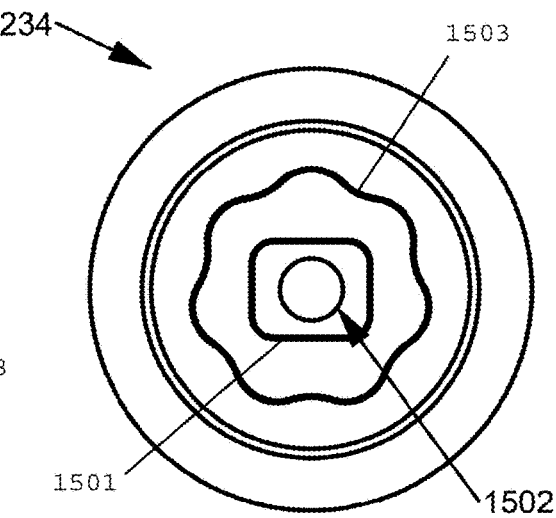
Figure 15C:
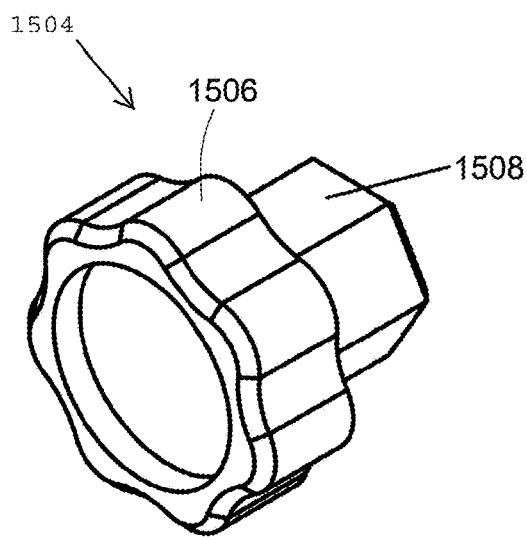
Figure 15D:
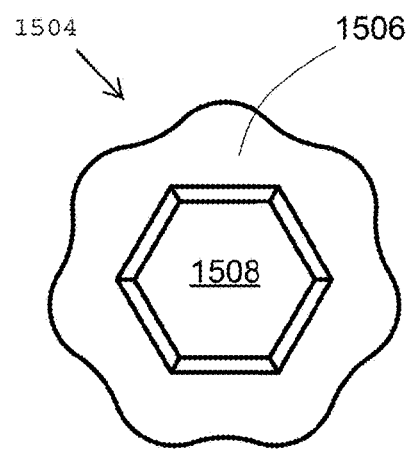
Figure 16A:
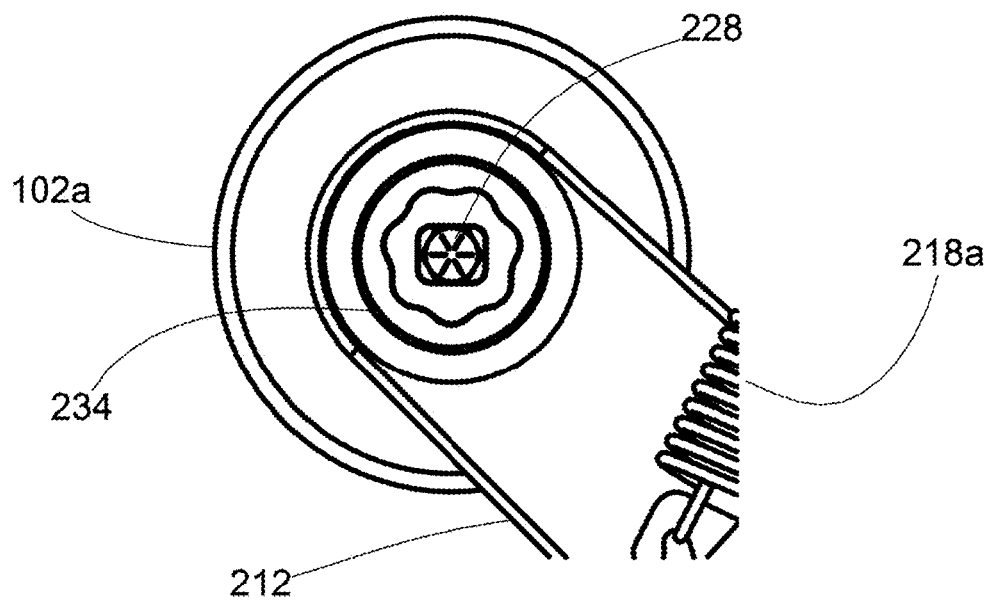
FIGS. 16A-16B illustrate side perspective views of flower nuts assemblies, where
Figure 16B:
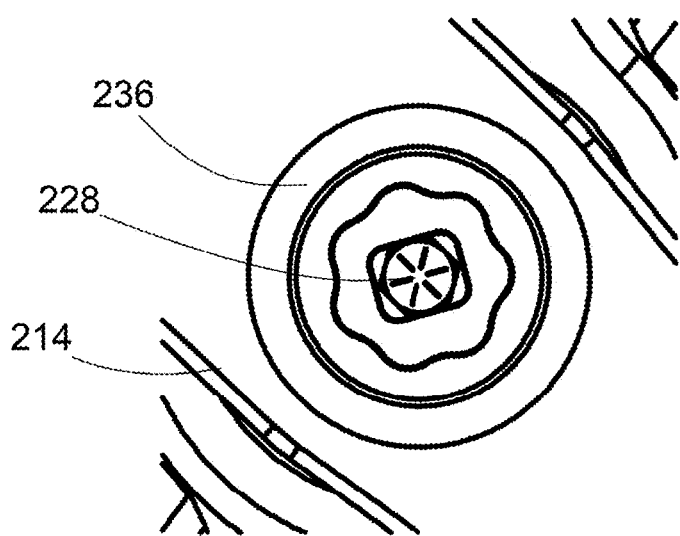

In some embodiments, the first flower nut 234 may comprise a tapered outer surface 1500, a rectangular interior surface 1501 proximate to and centered about a centrally-located through hole 1502, the rectangular interior surface 1501 sized to closely fit therein and engage the head of a fastener 228, and a curvilinear interior surface 1503 axially spaced apart from the rectangular interior surface 1501, the curvilinear interior surface 1503 comprising curved creating a flower-like shape as shown in FIGS. 15A-B. The tapered outer surface 1500 is configured to help prevent a wrench from forcibly gripping the outside of the fastener 228 and turning or prying the fastener 228 from its respective hole. Further, a special socket 1504 is provided to rotatably attach and detach the first flower nut 234 from the respective boreholes. FIGS. 15C and 15D show the socket 1504 with a hexagonal protrusion 1508 configured to fit in a standard sized socket or wrench, and a curvilinear exterior surface 1506 corresponding in shape with and configured to fit into and engage with the curvilinear interior surface 1503 of the first flower nut 234.

The first flower nut 234 may be configured to cover first bearing 806 by mounting to the appropriate face of the bearing to allow smooth rotation about the first bearing 806. The first flower nut 234 also helps prevent tampering with the fastener 228. In one embodiment, a raised boss is utilized on the back of the first flower nut 234. The raised boss allows the first bearing 806 and the flower nut 234 to rotate as a unitary piece. For example, the first flower nut 234 contacts the inner bearing race of the first bearing 806 bearings, causing the first flower nut 234, and the first bearing 806 to rotate as one. This is because the outer race is pressed and fixed into the bearing's housing of the arm which it is pressed into. Thus, the first flower nut 234 tightens against the inner bearing race without contacting the outer bearing race.

As FIG. 16A shows, the first flower nut 234 substantially covers, or encapsulates the perimeter of, the head of the fastener 228, which is used to attach the device 100 to the first arm assembly 212. However, in alternative embodiments, the first flower nut 234 serves as the head of the fastener 228. For example, the fastener 228 is a simple screw and the first flower nut 234 serves as the head for the screw. This configuration helps prevent tampering of the fastener 228, and allows the fastener 228 to be used in multiple locations. The flower-shaped flower nut configuration also allows the threading to be locked through nylon patched screws which are more readily available. In other embodiments, a thread lock or nylon patch screw may be utilized to join the flower nut to the first hole of the first arm assembly 212, and the device 100. A retaining ring may also be used behind the fastener 228 to retain the fastener 228 in place during assembly.

Turning now to FIG. 17A, the pulley block assembly 200 comprises a second arm assembly 214, which may be similar in width and thickness as the first arm assembly 212. The two arm assemblies 212, 214 join in an offset parallel arrangement extending perpendicularly to the axis of the sheave wheel 202. Similar to the first arm mount assembly 212, the second arm assembly 214 may be nominally oriented at about a forty-five degree angle to the longitudinal axis of the frame 208 (or any other suitable angle, such as forty degrees, fifty degrees, thirty-five degrees, fifty-five degrees, thirty degrees, sixty degrees, or any angle there between), approximately maintaining this orientation during use, on average, through use of a fastener 228, fasteners 230a-n, and springs 218a-b that generate spring tension across the arm assemblies 212, 214.

As FIG. 17B illustrates, the second arm assembly 214 comprises an outer end 1700a and an opposing inner end 1700b. This is a similar configuration to the first arm assembly 212. The outer end 1700a of the second arm assembly 214 is configured to form at least one ground hole 1704a, 1704b. The inner end 1700b of the second arm assembly 214 defines a second depression 1702 within which is located one or more second mount holes 1706a, 1706b. An arm hub hole 1708 is formed in a central region of the second arm assembly 214 for coupling to the central axle 1000 of the sheave axle hub 804.

comprising With reference to FIG. 18, the pulley block assembly 200 may also comprise a tube coupler 226 that serves to connect the inner ends 1200a, 1700b of the first and second arm assemblies 212, 214. The tube coupler 226 comprises free ends that are sized and dimensioned to fit into the first and second cavities 1202, 1702 of the first and second arm assemblies 212, 214. This may be a friction fit connection, with or without additional fasteners. However, in other embodiments, bolts, magnets, screws, and other fastening mechanisms may be used to secure the free ends of the tube coupler 226 other respective cavities.

In one example embodiment, the free ends have a circular or cylindrical shape with one or more flat surface ends 1800. In this manner, the first and second mount assemblies 212, 214 couple together in predetermined angular alignment with one another. As FIG. 18 references, the tube coupler 226 may be constructed from heavy wall aluminum tubing, for example, that is machined to have flat surface ends 1800 on opposing sides. The flat surface ends 1800 create more strength and rigidity for coupling the first and second arm assemblies 212, 214 at their inner ends. Multiple tube fasteners 238a-n may be used to secure the tube coupler 226 to the arm assemblies 212, 214. A socket 240 (FIG. 8) can be used to rotatably engage the tube fastener 238a and secure the tube coupler 226 between the first and second arm assemblies 212, 214.

As shown in FIG. 16B, the pulley block assembly 200 may be provided with a second flower nut assembly 236 that helps prevent unauthorized or accidental removal of its corresponding fastener 228, or any of the other fasteners behind it, such as fasteners 230a-n. In one embodiment, the second flower nut assembly 236 is utilized to cover the terminus of its corresponding fastener 228. The second flower nut assembly 236 may be similar to or the same as the first flower nut 234 and its corresponding fastener 228, and may interact with bearing 808 in the same or similar manner than the first flower nut 234 interacts with bearing 806.

In some embodiments, the at least one second bolt 238a-n may include a long center bolt 230a surrounded by six small screws 230n. However, in alternative embodiments, different numbers and lengths of bolts, screws, and fastening mechanisms may also be used. The bolt and the screws are arranged in a circular pattern that creates a structural integrity and secure fastening mechanism, for redundancy and added strength. In various example embodiments, the long center bolt may be greater than three inches in length; while the small screws may be less than one inch in length.

Figure 19:
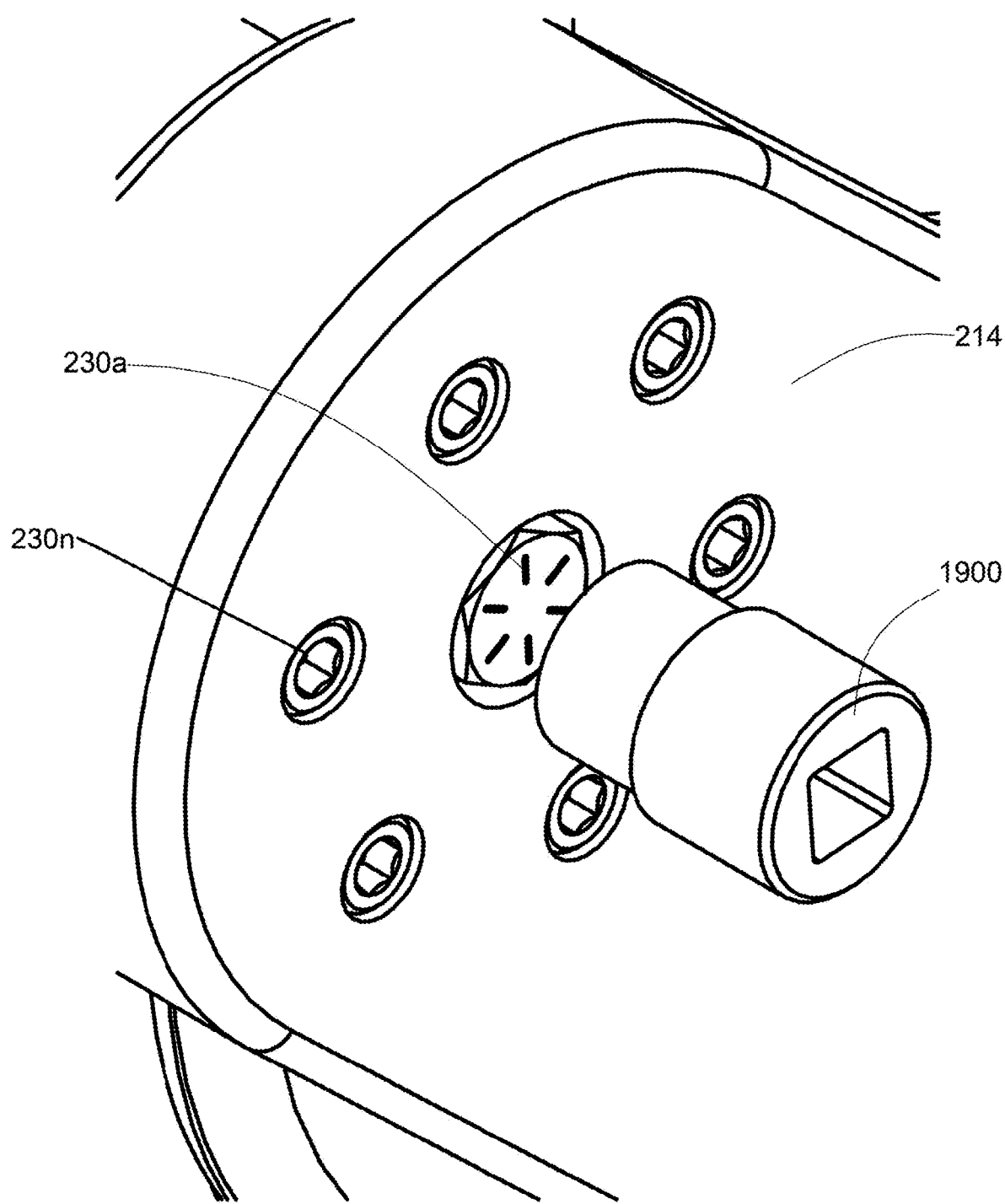
FIG. 19 illustrates an exemplary modified socket accessing a long center bolt, in accordance with example embodiments.

As shown in FIG. 19, a modified socket 1900 may be utilized to access the long center bolt 238a. This may be necessary where the counterbore diameter for the center bolt 238a is smaller than the outer diameter of the smallest socket for that size fastener. This feature helps prevent tampering. Any or all of the fasteners used with the pulley block assembly 200 may optionally utilize locking hardware, such as a collar/socket head lock washer, or a nylon patch on the thread portion of the bolts.

Furthermore, since the pulley block assembly 200 typically carries electrical cable, it is necessary to include a grounding attachment 216, i.e., ground arm, metal block to prevent electrocution of the operators, and electrical mishaps. The grounding attachment 216 serves as a reference point for the voltage, creating a common return path for electrical current, and a direct physical connection to the earth. The grounding attachment 216 is configured to maintain constant contact with the cable or wire in the device 100, and the sheave wheel 202. Thus, the grounding attachment 216 makes the initial contact with the cable to keep it grounded.

Figure 20A:
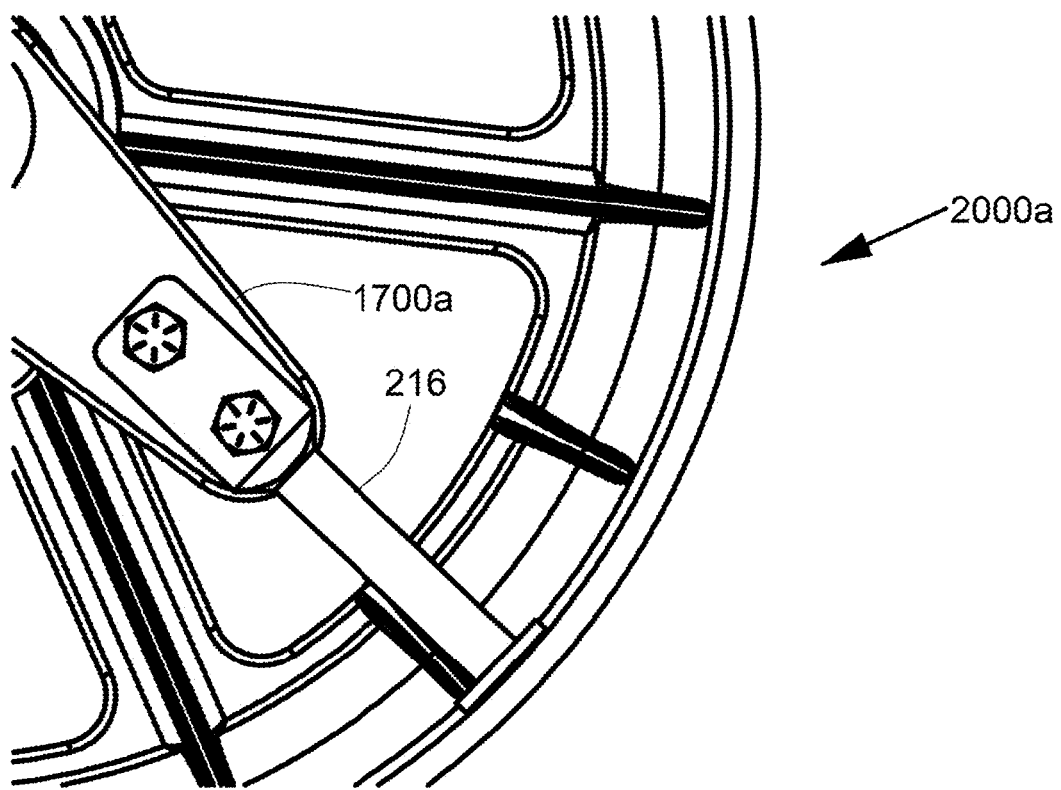
FIGS. 20A-20B illustrate elevated side view of an exemplary grounding attachment in relation to the sheave wheel, where
Figure 20B:
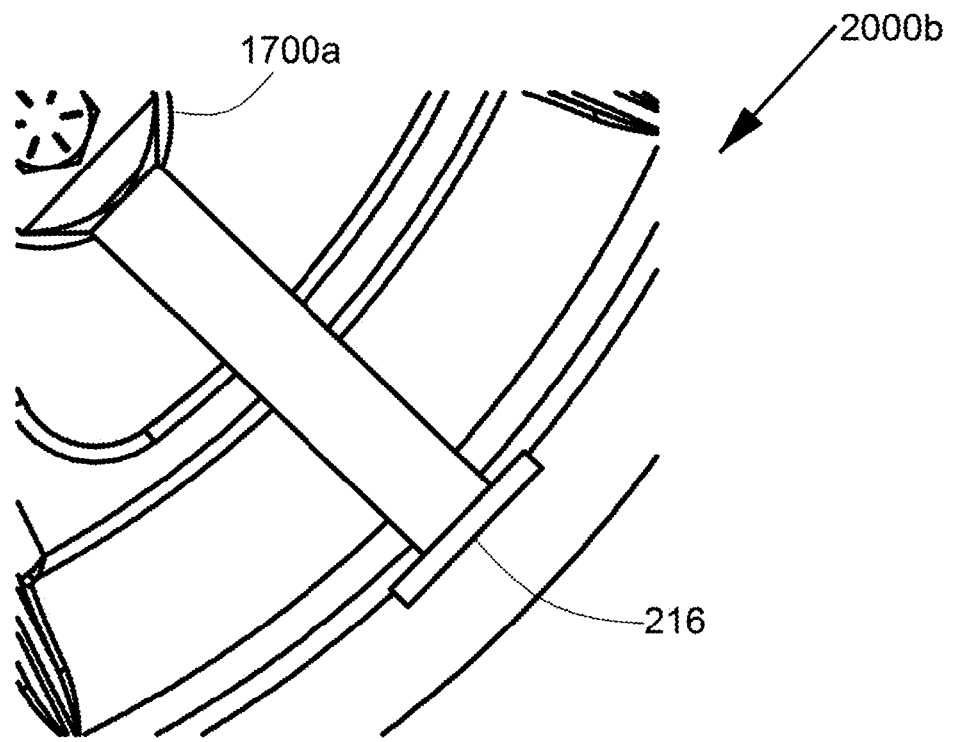

In various example embodiments, the grounding attachment 216 is held at a fixed orientation relative to the device 100, and is held generally in position with respect to the sheave wheel 202 through use of spring tension generated by a springs 218a-b, discussed below. As FIG. 20A shows, the grounding attachment 216 positions one-half inch or more, for example, inside of a twenty-two inch sheave wheel 2000a for clearance. And as FIG. 20B illustrates, for a twenty-eight inch sheave wheel 2000b, the grounding attachment 216 is kept the same, and thus there is more clearance. The invention is not limited by specific dimensions unless specifically claimed; all dimensions provided are otherwise simply examples for reference only.

Looking again at FIG. 2, the grounding attachment 216 attaches directly to the outer end 1700a of the second arm assembly 214, through the at least one ground hole 1704a-b. The pulley block assembly 200 provides at least one third bolt 232 that is sized and dimensioned to pass through fastening holes formed in the grounding attachment 216; and the at least one ground hole 1704a, 1704 that form in the second arm assembly 214. In this manner, the grounding attachment 216 fixedly fastens to the second arm assembly 214. In some embodiments, the third bolt 232 has a threaded portion for threaded coupling. In some embodiments, the threaded portion of the third bolt 232 may include, without limitation, a collar, a socket head lock washer, and a nylon patch. These components help to secure the third bolt 232 in place.

Figure 21A:
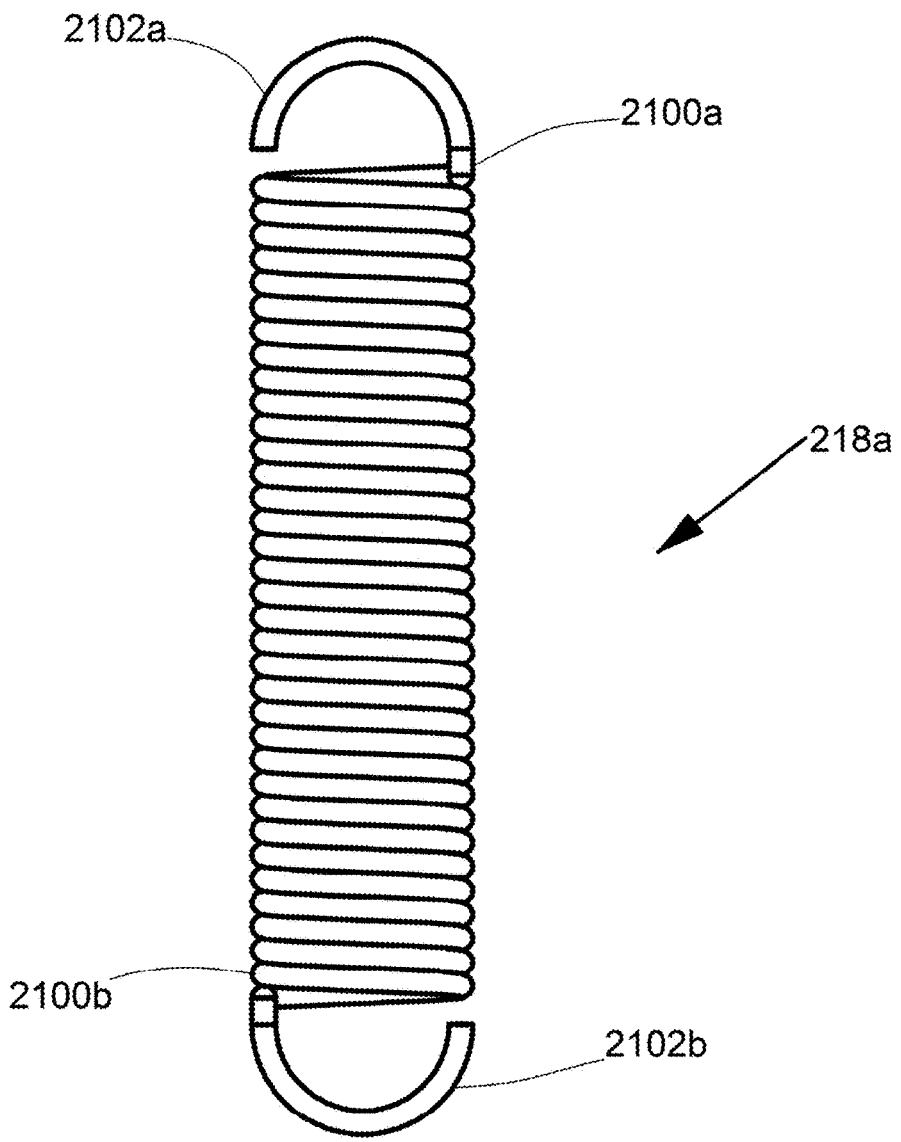
FIGS. 21A-21B illustrates an exemplary spring, where
Figure 21B:
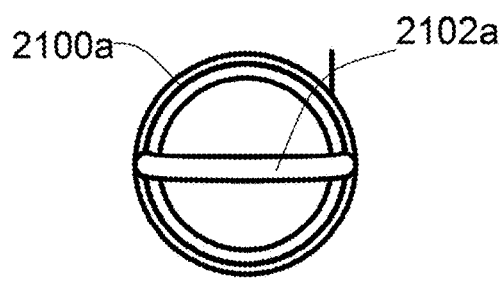
Figure 22:
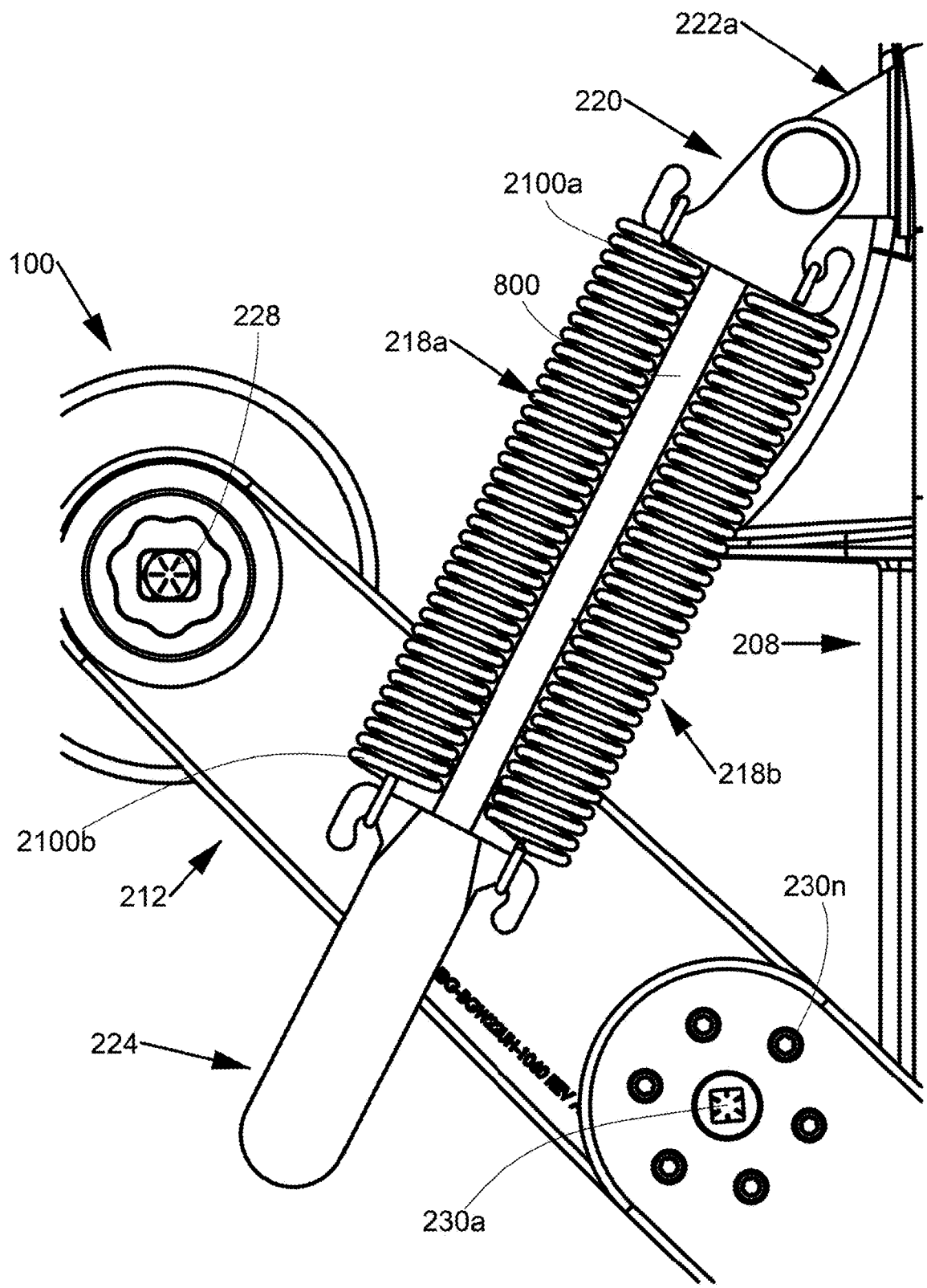
FIG. 22 illustrates a perspective side view of the springs tensioned between the first arm assembly and the frame, in accordance with example embodiments.

As FIG. 21A shows, the pulley block assembly 200 further comprises one or more springs 218a-b. In one example embodiment, two parallel, spaced-apart springs 218a, 218b are utilized to generate a spring tension on the arm assemblies 212, 214, so as to approximately maintain, on average, the desired distance between the device 100 and the sheave wheel 202. The spring tension also serves to maintain the grounding attachment 216 at a relatively consistent orientation. The springs 218a-b are configured to generate a spring tension on the first and second arm assemblies 212, 214. In one embodiment the arm assemblies 212, 214 are constrained to be nominally approximately forty-five degrees from the longitudinal axis of the frame 208 (or any other suitable angle, such as forty degrees, fifty degrees, thirty-five degrees, fifty-five degrees, thirty degrees, sixty degrees, or any angle there between). The spring tension also tends to maintain the concave central portion 112 between the discs 102a-b within a predetermined dimensional range above the groove 206 of the sheave wheel 202, for instance about one half inch, nominally, for example, which amount varies during use as the springs 218a-b expand and contract as tension against the cable varies.

As FIGS. 21 through 24C reference, the springs 218a-b comprise an upper end 2100a oriented toward the frame 208, and a lower end 2100b oriented toward first arm 212. A pair of spring hooks form at opposing ends 2100a-b of the springs 218a-b (FIG. 21B). Additionally, the pulley block assembly 200 comprises an upper spring clamp 220 that attaches to the upper end 2100a of the springs 218a-b (See FIG. 23). The upper spring clamp 220 is configured to attach to the frame 208.

Figure 24A:
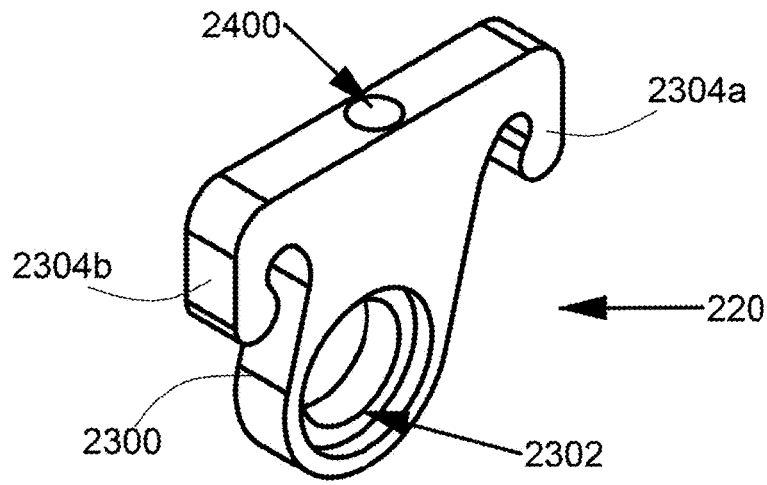
FIGS. 24A-24C illustrate an exemplary upper spring clamp, where
Figure 24B:
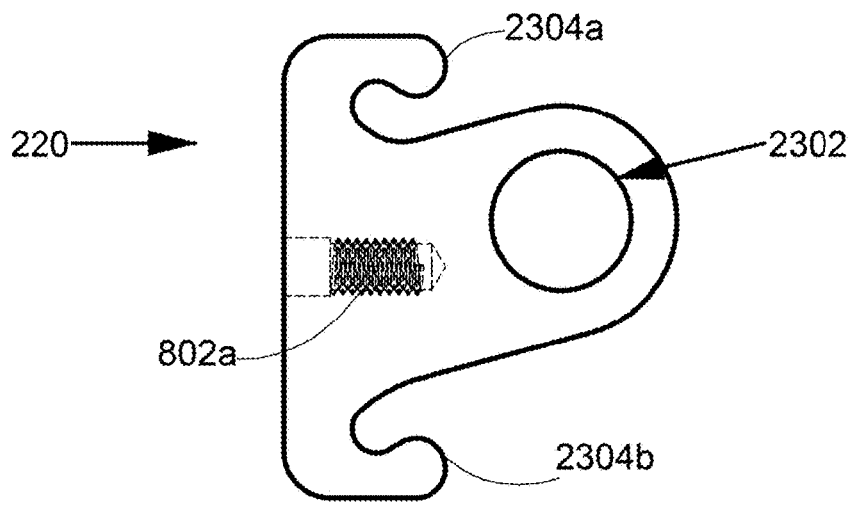
Figure 24C:
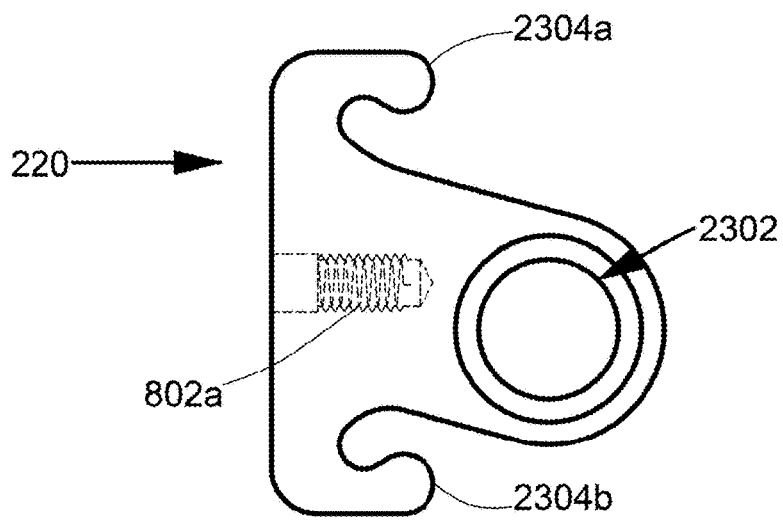
Figure 30A:
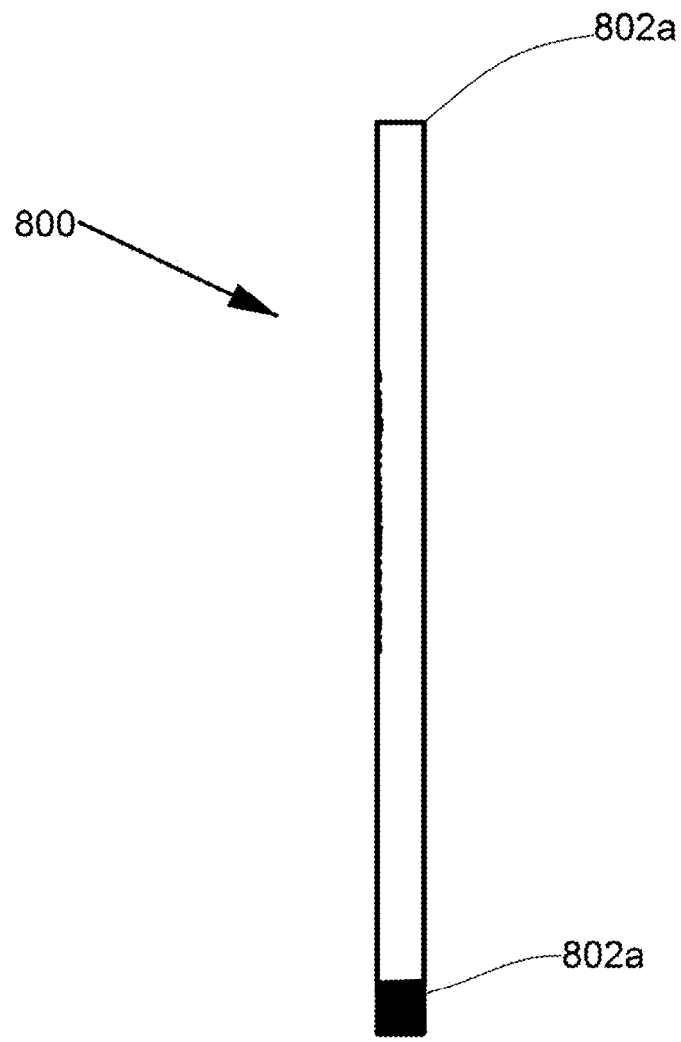
FIGS. 30A-30B illustrate a mount bolt, where
Figure 30B:
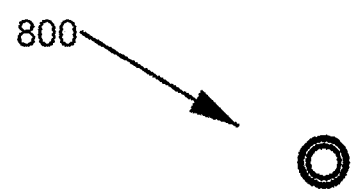

As FIG. 24A illustrates, the upper spring clamp 220 may include a short plate 2300 comprising a mount hole 2302 and having a bore hole 2400 that receives one end of the mount bolt 800 (FIGS. 8 and 30A-B). The plate 2300 terminates at U-shaped mounting members 2304a, 2304b designed to mount to the springs 218a-b. For example, the hook 2102a at the upper end 2100a of the spring 218a slides into either of the ends of the U-shaped mounting member 2304a-b. FIG. 24B shows a top view, and FIG. 24C shows a bottom view of the upper spring clamp 220.

Figure 25:
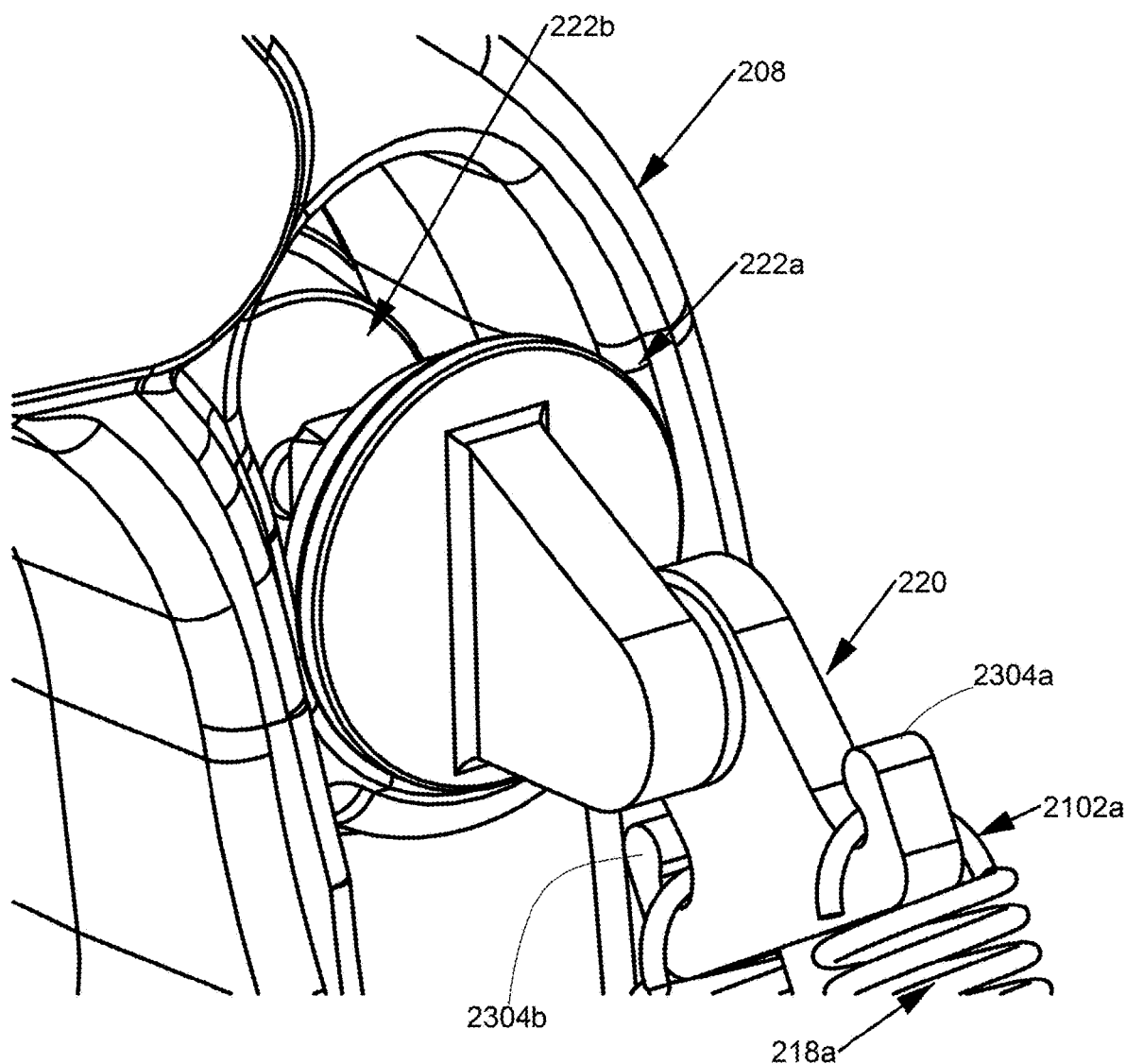
FIG. 25 illustrates a front perspective side view of the spring held in place by the upper spring clamp, which fastens to the frame mount, in accordance with example embodiments.

FIGS. 8 and 25 show example frame mounts 222a, 222b mounted to the frame 208, which provides a mounting surface for the upper spring clamp 220 to attach thereto. The frame mounts 222a-b comprise cylindrical portions that are sized correspondingly to the width of frame spring mount hole 1100 in the frame 208 (FIG. 11A), as well as shoulder portions that are larger the width of hole 1100, such that when the frame mounts 222a-b are placed in either side of hole 1100 and fastened together, the frame mounts 222a-b align within hole 1100 and are fixedly engaged with the frame 208. The frame mounts 222a-b provide a flat rigid surface for enhancing structural integrity of the frame 208, and for attachment to the upper spring clamp 220.

Upper spring clamp 220 may be attached to frame mount 222a by a shaft 242 having a shoulder, wherein the shaft goes through hole 2302 in upper spring clamp 220, through washer 223, and into a correspondingly-sized and shaped hole in frame mount 222a, such the shoulder on shaft 242 is larger than hole 2302 and thus prevents upper spring clamp 220 from sliding off the shaft 242. The shaft 242 is held in place within the upper spring clamp 220 by a fastener 812a that engages with and travels through a through-hole 814 (which may be threaded) in frame mount 222a that is perpendicular with the longitudinal axis of the shaft 242, and is positioned such that the fastener 812a engages shaft 242 within frame mount 222a and holds shaft 242 within frame mount 222a. Helping to prevent tampering, fastener 812a is inaccessible when frame mounts 222a-b are fastened together.

Figure 26:
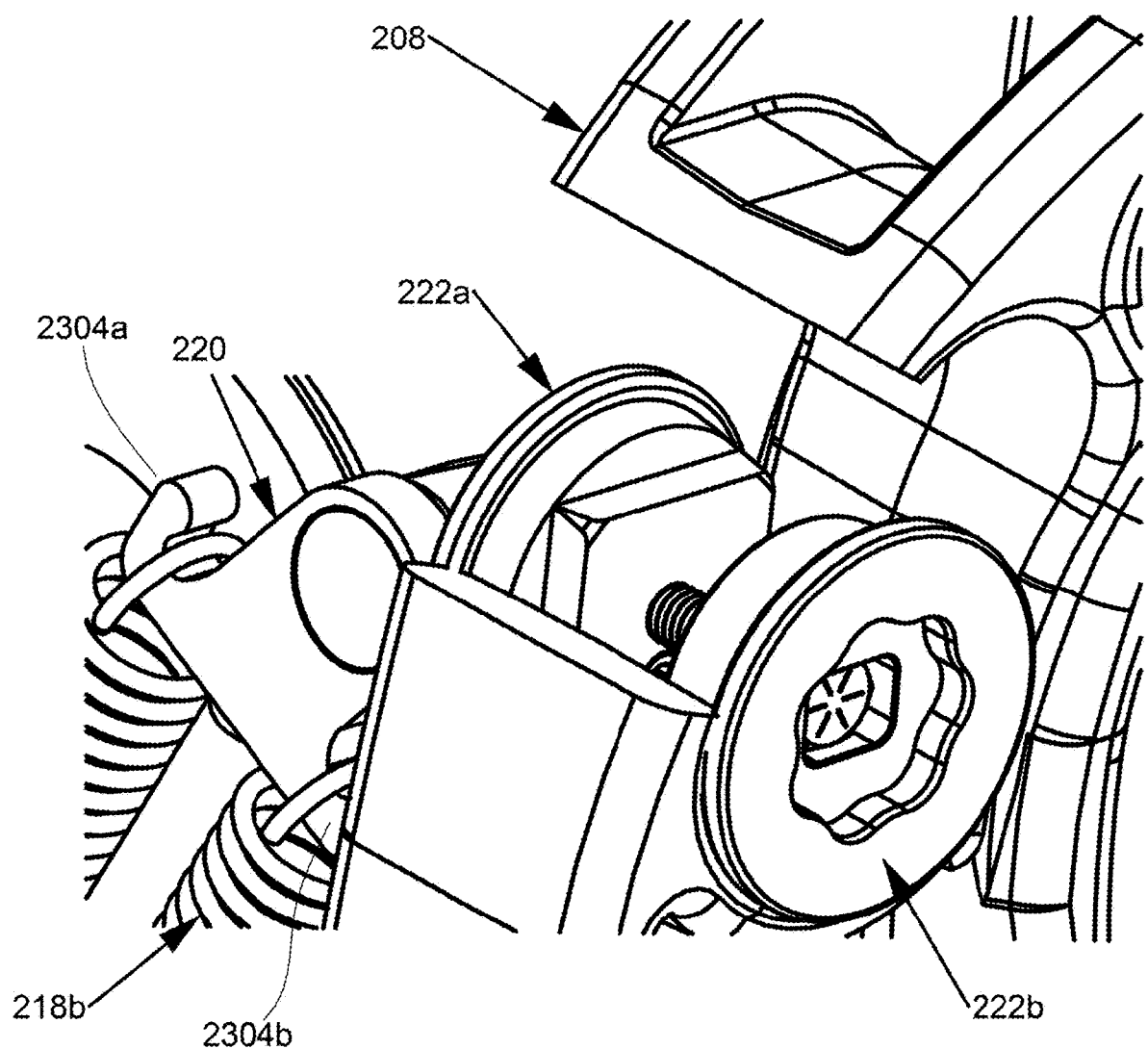
FIG. 26 illustrates a rear perspective side view of the spring held in place by the upper spring clamp, which fastens to the frame mount, in accordance with example embodiments, with the frame shown partially cut away.

As best seen in FIGS. 8, 25, and 26, frame mount 222b may comprise a tamper-resistant flower nut assembly having all the same features as first flower nut 234 (except little or no tapered outer surface 1500), as described previously herein, including a threaded fastener that extends to and engages within a corresponding threaded hole in frame mount 222*a*, thereby clamping frame 208 between frame mounts 222*a* and 222*b*, through frame spring mount hole 1100. Note that frame 208 is shown partially cut away in FIG. 26 for clarity (compare FIG. 11A).

springs 218*a-b* The washer 223, which may be machined stainless-steel or any other suitable material, creates a predetermined width between the upper spring clamp 220 and the frame mount 222*a*, so as to help in alignment. This aids with friction and ensures the springs 218*a-b* aligned in parallel with the first arm assembly 212 and does not mount crooked or wear incorrectly.

Figure 23:
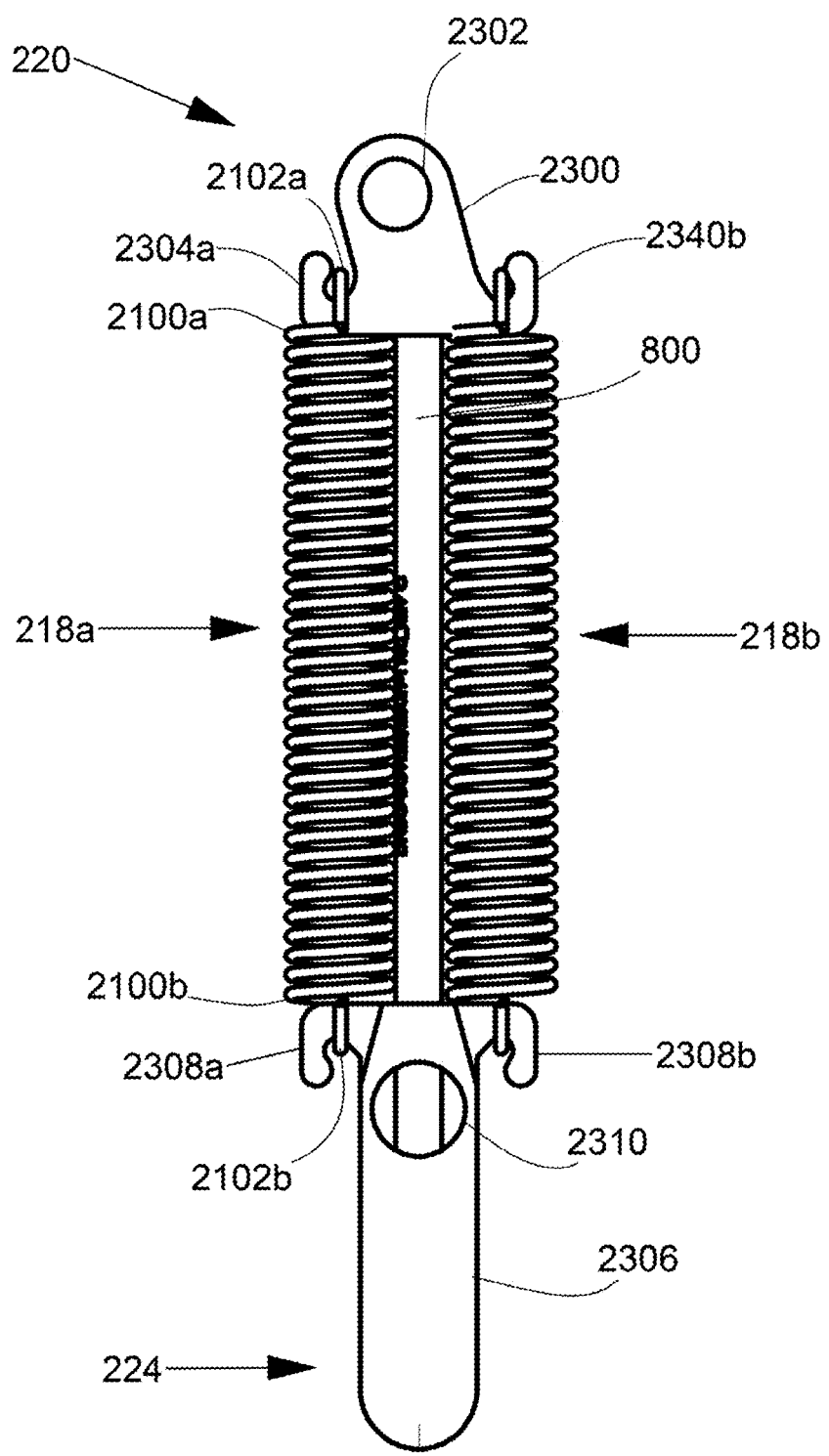
FIG. 23 illustrates a perspective view of the springs extended between an upper spring mount and a lower spring clamp, in accordance with example embodiments.

At the opposing lower end of the springs 218*a-b*, a lower spring mount 224 attaches to the springs 218*a-b*, as depicted in FIGS. 27A through 29. In some embodiments, the lower spring mount 224 is an elongated plate 2306 with one end having U-shaped mounting members 2308*a*, 2308*b*. The hooks at the lower end of the springs 218*a-b* slide into the U-shaped mounting member 2308*a-b*. As best seen in FIG. 23, a stud mount hole 2310 is formed at the opposing end of the elongated plate 2306. The lower spring mount 224 is configured to attach to the first arm assembly 212 by attaching the stud mount hole 2310 to a correspondingly-sized stud 244 (FIG. 8) that is attached to the first spring mount hole 1208 in the first arm assembly 212 To limit tampering, the stud 244 may be attached to the first arm assembly 212 by a fastener located in an undersized hole, such that a special socket 240 is required to remove the fastener, for instance as described herein with respect to fastener 238*a* and shown in FIG. 8.

Figure 27A:
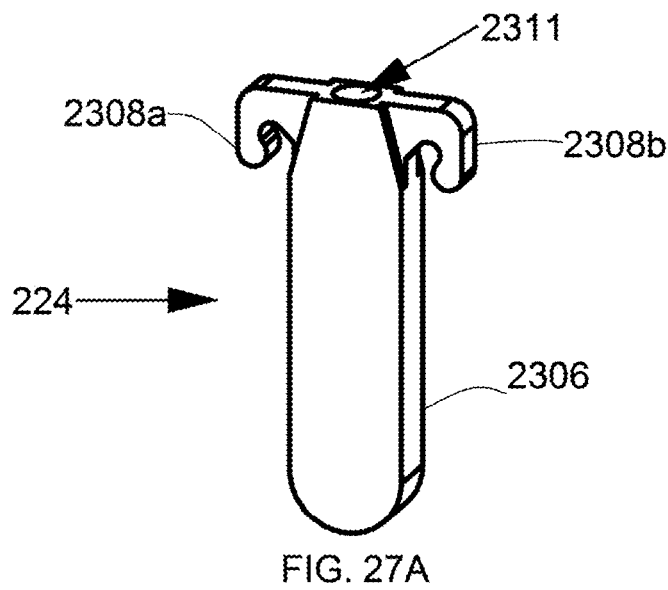
FIGS. 27A-27C illustrate an exemplary lower spring mount, where
Figure 27B:
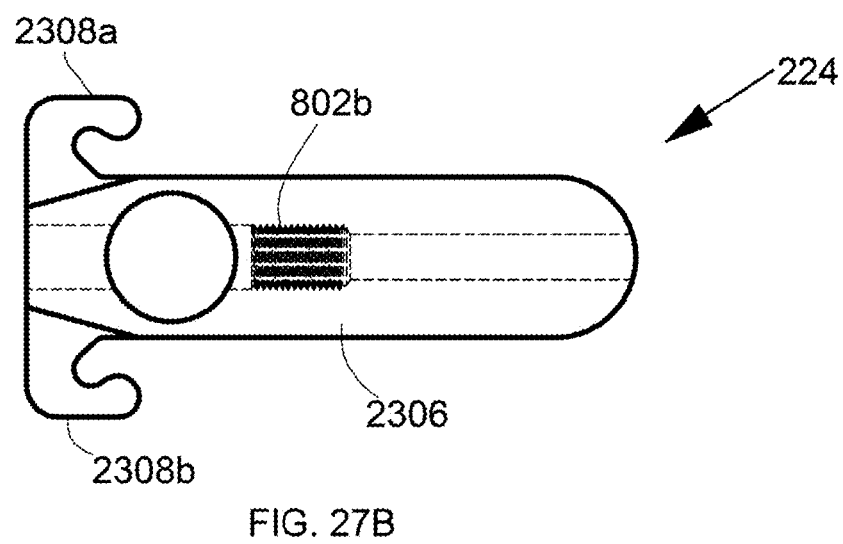
Figure 27C:
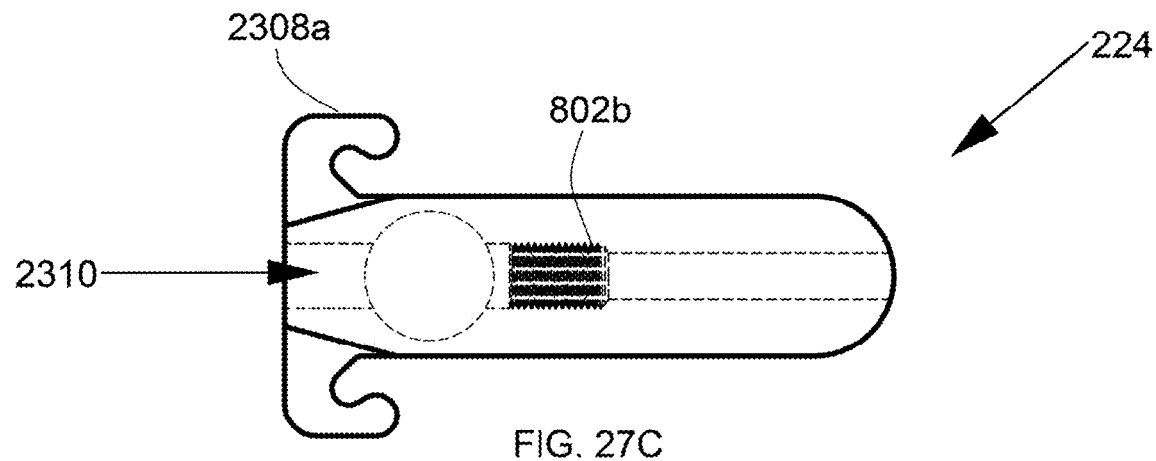
Figure 28:
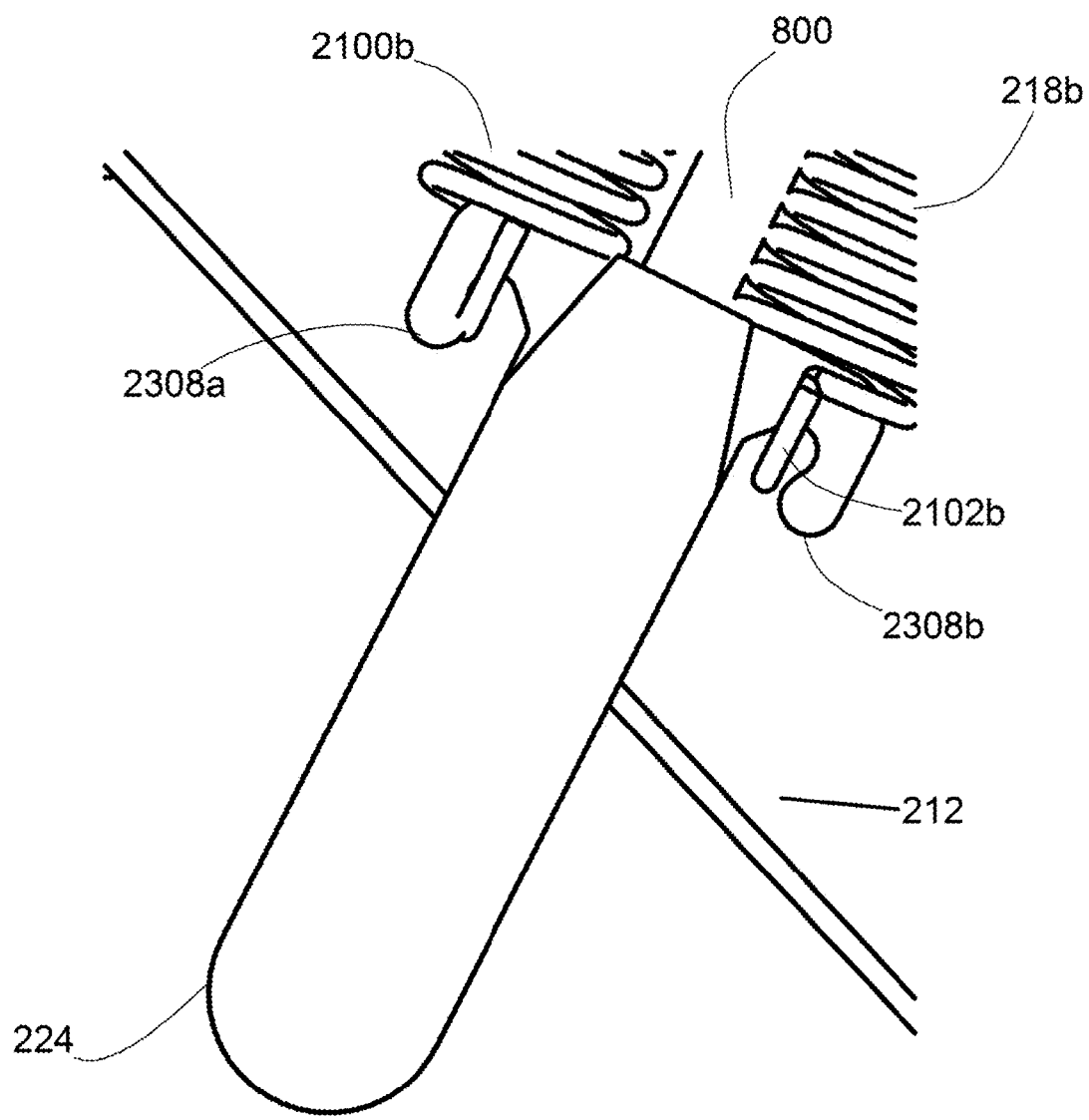
FIG. 28 illustrates a close up view of the lower spring mount fastened to the first arm assembly, in accordance with example embodiments.
Figure 29:
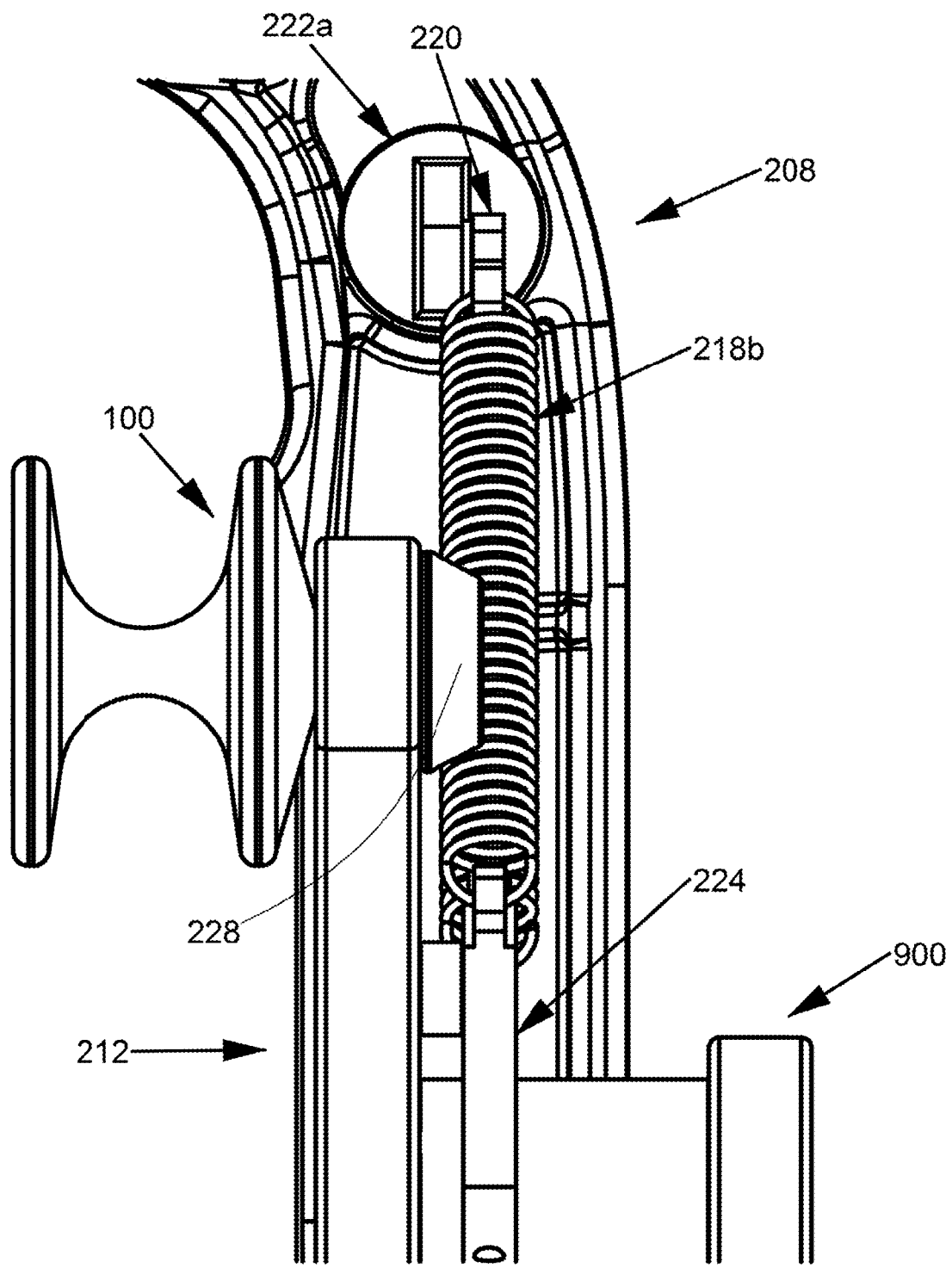
FIG. 29 illustrates a perspective view of the spring extended between the upper spring clamp and the lower spring mount, in accordance with example embodiments.

As shown in FIG. 27A, a bore hole 2311 may be formed at the end of the elongated plate 2306, so as to enable passage of the bottom end 802*b* of the mount bolt 800. FIG. 27B shows a top view of the lower spring mount 224, and FIG. 27C shows a bottom view of the lower spring mount 224. FIG. 29 illustrates a front view of both ends of the springs 218*a-b* mounted across the pulley block assembly 200, from the frame 208 at the upper end of the springs 218*a-b*, to the first arm assembly 212 at the lower end of the springs 218*a-b*.

To enhance the structural integrity of the springs 218*a-b*, a mount bolt 800 can be used to connect the upper spring clamp 220 to the lower spring mount 224 (FIG. 30A). The mount bolt 800 comprises an upper bolt end 802*a* and a threaded lower bolt end 802*b*. The lower bolt end 802*b* of the mount bolt 800 is threaded, in order to mate with the threaded inner surface of the lower spring clamp 220. FIG. 30B illustrates a bottom view of the threaded lower bolt end 802*b*. The mount bolt 800 can have various lengths to enable adjustment to the spring tension, and the orientation of the device 100 and the grounding attachment 216 in relation to the pulley block assembly 200.

Examples will now be described of the device 100 in use. Turning to FIG. 31, a method 3100 of assembling the device to the pulley block assembly, and operation thereof is recited in flowchart is referenced. In operation through the method 3100, the device 100 is secured into place on the pulley block assembly 200 so that it is aligned with the sheave wheel 202. The device receives, and feeds the cable to the groove in the sheave wheel from this disposition. In essence, the device guides the cable onto the rotating sheave wheel, and the sheave wheel feeds the cable, such as a pilot line or electric wire, to the top of conductor poles/towers. It is therefore possible that the device operates with various types and sizes of block pulley assemblies. Or, the device may be integrated and manufactured with a specific pulley block assembly. In either case, the device is assembled in an operational mode with the pulley block assembly.

In various example embodiments, a method 3100 of assembly may include an initial Step 3102 of providing a unitary fastener and cable guidance device, having a pair of discs joined with a central axis, and a cantilevered axle integrally extended from one disc for enabling fastening. In some embodiments, the device may include a pair of discs, each disc comprising an inner side, an outer side, a disc rim, and a disc hub forming an annular depression between the pair of discs, the annular depression defining a minimum outer diameter about an axis; and a cantilevered axle comprising an outer axle diameter, an outer end, and an opposing inner end integral to the outer side of one of the discs, the cantilevered axle having a threaded axle borehole formed therein about the axis, the outer axle diameter is equal or greater than the minimum outer diameter.

The method 3100 may further comprise a Step 3104 of rotating the unitary fastener and cable guidance device. The device rotates at a predetermined rate, which may be automated or manual set by an operator. A Step 3106 includes introducing a cable to the axis of the unitary fastener and cable guidance device. The device rotates in a first direction, so as to feed the cable to the sheave wheel. In some embodiments, a Step 3108 comprises aligning the cable guidance device with a sheave wheel, the sheave wheel comprising a wheel hub hole and a groove extending up to a pair of wheel rims. As discussed above, the spring tension from a spring on the mount arm assemblies helps maintain the device in alignment with the sheave wheel, nominally at an approximate predetermined distance.

A Step 3110 includes attaching a first bearing to the outer end of the cantilevered axle. The first bearing allows the device to rotate freely and in alignment with the first arm assembly. In some embodiments, a Step 3112 may include attaching a first arm assembly to the cantilevered axle and the first bearing. The first arm assembly may be nominally oriented at about a forty-five degree angle to the longitudinal axis of the frame 208 (or any other suitable angle, such as forty degrees, fifty degrees, thirty-five degrees, fifty-five degrees, thirty degrees, sixty degrees, or any angle there between), approximately maintaining this orientation during use, on average, by use of first and second fasteners and springs that generate spring tension.

A Step 3114 comprises attaching the first arm assembly to a second arm assembly, the second arm assembly mounted to the axle hub, which is mounted to the frame 208. A second bolt can be used to pass through the respective holes for mounting the arm assemblies. The method 3100 may further comprise a Step 3116 of attaching a grounding attachment to the second arm assembly, the grounding attachment configured to provide an electrical ground for the cable. The grounding attachment may include any component that can ground an electrical circuit.

In some embodiments, a Step 3118 includes maintaining a spring tension, through at least one spring, between the frame and the first arm assembly, the arm assemblies are nominally maintained at an approximately forty-five degree angle with respect to the longitudinal axis of the frame (or any other suitable angle, such as forty degrees, fifty degrees, thirty-five degrees, fifty-five degrees, thirty degrees, sixty degrees, or any angle there between), and the distal end of the grounding attachment maintains a substantially fixed radial distance from the outer edge of the sheave wheel. The springs 218*a-b* are configured to generate a spring tension on the first and second arm assemblies 212, 214. In one embodiment the disc rims of the device 100 are approximately one half inch above the sheave wheel 202 when the arm assemblies 212, 214 are oriented at an approximately forty-five degree angle with respect to the longitudinal axis of the frame.

A Step 3120 comprises rotating the sheave wheel. The sheave wheel can be rotated automatically, or manually by the operator. A additional Step 3122 includes drawing in, with the sheave wheel, the cable from the unitary fastener and cable guidance device 100. Both the sheave wheel and the device can rotate in two directions and at multiple speeds, so as to adapt the stringing of the cable as needed.

In conclusion, a unitary fastener and cable guidance device for a pulley block assembly is operable with a pulley block assembly for stringing cable across cable towers. The guidance device serves to guide a cable, wire, or any similar materials onto the pulley block assembly while decreasing the chances of derailing by providing an unusually deep profile for a given device size. The one-piece design of the device 100 comprises a pair of discs joined at the center with an axis; and a cantilevered axle extending from the outer side of one of the discs. The discs and axis rotate to feed and guide the cable directly onto a sheave wheel of the pulley block assembly. This unitary configuration reduces the number of components including fasteners. Since the unitary cantilevered axle is the fastening mechanism, rather than an axle extending through a hole formed through the middle of the device, the middle of the device can be smaller in diameter, in fact smaller than the diameter of the cantilevered axle. This allows the device to be smaller in overall outer diameter, and/or makes a given device size more robust at holding therein cable of a given size. Various bolts, flower nuts, springs, and fastening mechanisms may be used to minimize the potential for tampering, and to maintain the device and the pulley block assembly at desired orientations with respect to each other.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A unitary fastener and cable guidance device, the device comprising:
   a pair of discs, each disc comprising an inner side, an outer side, a disc rim, and a disc hub forming an annular depression between the pair of discs, the annular depression defining a minimum outer diameter about an axis, wherein each inner side extends inward toward the minimum outer diameter, such that the annular depression forms a hyperbolic shape;
   a cantilevered axle comprising an outer axle diameter, an outer end, and an opposing inner end integral to the outer side of one of the discs, the cantilevered axle having a threaded axle borehole formed therein about the axis; and
   a cavity comprising an axially extending wall comprising a hexagonal shape formed in the outer side of the other disc;
   the outer axle diameter being equal to or greater than the minimum outer diameter
   wherein the pair of discs, the cantilevered axle, and the cavity are monolithic.

2. The unitary fastener and cable guidance device of claim 1, wherein each of the disc rims comprise a curved peripheral edge.

3. The unitary fastener and cable guidance device of claim 1, wherein the annular depression and the inner side of each of the discs form a smooth junction.

4. The unitary fastener and cable guidance device of claim 1, wherein the cantilevered axle of the device is configured to attach to an arm portion of a pulley block assembly comprising a sheave wheel so that the device will be aligned with the sheave wheel to rotatably direct a cable in a circumferential direction to the sheave wheel.

5. A pulley block assembly, the assembly comprising:
   the unitary fastener and cable guidance device of claim 1 rotatably connected to an arm assembly that is rotatably connected to a frame to which a sheave wheel having a circumferential groove is rotatably connected, the unitary fastener and cable guidance device operable to rotatably direct a cable in a circumferential direction toward, and in alignment with, the circumferential groove in the sheave wheel.

6. The pulley block assembly of claim 5, further comprising the unitary fastener and cable guidance device rotatably connected to the arm assembly with a tamper-resistant flower nut having a tapered outer surface and a curvilinear inner wall surface having a shape configured to engage a correspondingly-shaped tool, the tamper-resistant flower nut rotationally engaged with a threaded fastener fastened to the threaded axle borehole.

7. The pulley block assembly of claim 5, further comprising the arm assembly rotatably connected to the frame with a tamper-resistant flower nut having a tapered outer surface and a curvilinear inner wall surface having a shape configured to engage a correspondingly-shaped tool, the tamper-resistant flower nut rotationally engaged with a threaded fastener fastened to a hub attached to the frame.

8. The pulley block assembly of claim 7, further comprising the hub is coaxial with an axle about which the sheave wheel is configured to rotate.

9. The pulley block assembly of claim 5, further comprising a grounding attachment extending from the arm assembly in a direction away from the unitary fastener and cable guidance device.

10. The pulley block assembly of claim 5, further comprising a spring-loaded mechanism connected at a first end to the frame and at a second end to the arm assembly, the spring-loaded mechanism configured to hold the arm assembly at a nominal angular position with respect to the frame.

11. The pulley block assembly of claim 10, configured such that the angular position of the arm assembly with respect to the frame can change when one or more springs in the spring-loaded mechanism are deflected by a radial force applied to the unitary fastener and cable guidance device.

12. A method of using a pulley block assembly, comprising the steps of:
   providing a pulley block assembly comprising:
      a unitary fastener and cable guidance device, the device comprising:
         a pair of discs, each disc comprising an inner side, an outer side, a disc rim, and a disc hub forming an annular depression between the pair of discs, the annular depression defining a minimum outer diameter about an axis, wherein each inner side extends inward toward the minimum outer diameter, such that the annular depression forms a hyperbolic shape; and
         a cantilevered axle comprising an outer axle diameter, an outer end, and an opposing inner end integral to the outer side of one of the discs, the cantilevered axle having a threaded axle borehole formed therein about the axis;
         a cavity comprising an axially extending wall comprising a hexagonal shape formed in the outer side of the other disc;
         the outer axle diameter being equal to or greater than the minimum outer diameter
         wherein the pair of discs, the cantilevered axle, and the cavity are monolithic;
      the unitary fastener and cable guidance device rotatably connected to an arm assembly that is rotatably connected to a frame to which a sheave wheel having a circumferential groove is rotatably connected, the unitary fastener and cable guidance device operable to rotatably direct a cable in a circumferential direction toward, and in alignment with, the circumferential groove in the sheave wheel;
      the pulley block assembly further comprising a spring-loaded mechanism connected at a first end to the frame and at a second end to the arm assembly, the spring-loaded mechanism configured to hold the arm assembly at a nominal angular position with respect to the frame, and further configured such that the angular position of the arm assembly with respect to the frame can change when one or more springs in the spring-loaded mechanism are deflected by a radial force applied to the unitary fastener and cable guidance device;
   directing a cable against the annular depression of the unitary fastener and cable guidance device and causing the unitary fastener and cable guidance device to rotate relative to the arm assembly; and
   directing the cable from the unitary fastener and cable guidance device into the circumferential groove in the sheave wheel and causing the sheave wheel to rotate relative to the arm assembly.

13. The method of using a pulley block assembly of claim 12, further comprising the steps of:
   applying radial force to the unitary fastener and cable guidance device with the cable;
   deflecting one or more springs in the spring-loaded mechanism; and
   causing the angular position of the arm assembly to change with respect to the frame.

14. A pulley block assembly including:
   a unitary fastener and cable guidance device formed from a single piece of material, the device comprising:
      a pair of discs, each disc comprising an inner side, an outer side, a disc rim, and a disc hub forming an annular depression between the pair of discs, the annular depression defining a minimum outer diameter about an axis;
      a cantilevered axle comprising an outer axle diameter, an outer end, and an opposing inner end integral to the outer side of one of the discs, the cantilevered axle having a threaded axle borehole formed therein about the axis;
      a cavity comprising an axially extending wall comprising a hexagonal shape formed in the outer side of the other disc; and
      the outer axle diameter being equal to or greater than the minimum outer diameter;
   an arm assembly, wherein the unitary fastener and cable guidance device is rotatably connected to the arm assembly;
   the arm assembly is rotatably connected to a frame to which a sheave wheel having a circumferential groove is rotatably connected, and the unitary fastener and cable guidance device operable to rotatably direct a cable in a circumferential direction toward, and in alignment with, the circumferential groove in the sheave wheel; and
   the unitary fastener and cable guidance device is rotatably connected to the arm assembly with a tamper-resistant flower nut having a tapered outer surface and a curvilinear inner wall surface having a shape configured to engage a correspondingly-shaped tool, the tamper-resistant flower nut rotationally engaged with a threaded fastener fastened to the threaded axle borehole.

15. The pulley block assembly of claim 14 wherein the tamper-resistant flower nut rotationally engaged with a threaded fastener fastened to a hub attached to the frame.

16. The pulley block assembly of claim 15, further comprising the hub is coaxial with an axle about which the sheave wheel is configured to rotate.

17. The pulley block assembly of claim 14, further comprising a grounding attachment extending from the arm assembly in a direction away from the unitary fastener and cable guidance device.

18. The pulley block assembly of claim 14, further comprising a spring-loaded mechanism connected at a first end to the frame and at a second end to the arm assembly, the spring-loaded mechanism configured to hold the arm assembly at a nominal angular position with respect to the frame.

19. The pulley block assembly of claim 18, configured such that the angular position of the arm assembly with respect to the frame can change when one or more springs in the spring-loaded mechanism are deflected by a radial force applied to the unitary fastener and cable guidance device.

* * * * *